United States Patent
Kuech et al.

(10) Patent No.: US 8,462,958 B2
(45) Date of Patent: Jun. 11, 2013

(54) APPARATUS AND METHOD FOR COMPUTING FILTER COEFFICIENTS FOR ECHO SUPPRESSION

(75) Inventors: Fabian Kuech, Erlangen (DE); Markus Kallinger, Erlangen (DE); Christof Faller, Lausanne (CH); Alexis Favrot, Biberstein (CH)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 285 days.

(21) Appl. No.: 12/864,890

(22) PCT Filed: Jan. 16, 2009

(86) PCT No.: PCT/EP2009/000270
§ 371 (c)(1),
(2), (4) Date: Oct. 14, 2010

(87) PCT Pub. No.: WO2009/095161
PCT Pub. Date: Aug. 6, 2009

(65) Prior Publication Data
US 2011/0019833 A1     Jan. 27, 2011

Related U.S. Application Data

(60) Provisional application No. 61/025,006, filed on Jan. 31, 2008.

(30) Foreign Application Priority Data
Aug. 22, 2008   (DE) .......................... 10 2008 039 330

(51) Int. Cl.
*H04B 3/20* (2006.01)

(52) U.S. Cl.
USPC ............ 381/66; 381/83; 381/93; 379/406.01; 379/406.06; 379/406.08; 379/406.12; 379/406.13

(58) Field of Classification Search
USPC .................. 381/66, 83, 93; 704/226, 233; 379/406.01–406.09, 406.12–406.13
See application file for complete search history.

(56) References Cited

U.S. PATENT DOCUMENTS

| | | |
|---|---|---|
| 5,699,424 A | 12/1997 | Hirano |
| 5,872,728 A | 2/1999 | Richter |

(Continued)

FOREIGN PATENT DOCUMENTS

| | | |
|---|---|---|
| EP | 0 746 133 A2 | 12/1996 |
| EP | 1 429 315 A1 | 6/2004 |

(Continued)

OTHER PUBLICATIONS

Official Communication issued in International Patent Application No. PCT/EP2009/000270, mailed on Jun. 25, 2009.

(Continued)

*Primary Examiner* — Disler Paul
(74) *Attorney, Agent, or Firm* — Keating & Bennett, LLP

(57) ABSTRACT

A preferred embodiment of an apparatus for computing filter coefficients for an adaptive filter for filtering a microphone signal so as to suppress an echo due to a loudspeaker signal includes an extractor for extracting a stationary component signal or a non-stationary component signal from the loudspeaker signal or from a signal derived from the loudspeaker signal, and a computer for computing the filter coefficients for the adaptive filter on the basis of the extracted stationary component signal or the extracted non-stationary component signal.

24 Claims, 17 Drawing Sheets

U.S. PATENT DOCUMENTS

| | | | |
|---|---|---|---|
| 5,930,366 | A | 7/1999 | Jamal et al. |
| 6,442,275 | B1 | 8/2002 | Diethorn |
| 6,665,645 | B1 | 12/2003 | Ibaraki et al. |
| 6,895,094 | B1 * | 5/2005 | Scalart et al. ............... 381/66 |
| 7,391,759 | B2 | 6/2008 | Wallace et al. |
| 7,889,804 | B2 | 2/2011 | Borran et al. |
| 2005/0058278 | A1 * | 3/2005 | Gallego Hugas et al. ............... 379/406.01 |
| 2005/0249347 | A1 * | 11/2005 | Derkx et al. ............. 379/406.06 |

FOREIGN PATENT DOCUMENTS

| | | |
|---|---|---|
| EP | 1 715 669 A1 | 10/2006 |
| EP | 1 879 181 A1 | 1/2008 |
| RU | 2 233 033 C2 | 6/2003 |
| RU | 2 319 307 C2 | 3/2008 |
| WO | 2004/002127 A1 | 12/2003 |
| WO | 2005/114656 A1 | 12/2005 |
| WO | 2006/036490 A1 | 4/2006 |
| WO | 2006/111370 A1 | 10/2006 |

OTHER PUBLICATIONS

Gustafsson et al., "A Psychoacoustic Approach to Combined Acoustic Echo Cancellation and Noise Reduction", IEEE Transactions on Speech and Audio Processing, Jul. 2002, vol. 10, No. 5, pp. 245-256.

Enzner et al., "Partitioned Residual Echo Power Estimation for Frequency-Domain Acoustic Echo Cancellation and Postfiltering", European Transaction on Telecommunications, Mar.-Apr. 2002, vol. 13, No. 2, pp. 103-114.

English translation of RU 2211531 (C2).

* cited by examiner

APPARATUS AND METHOD FOR COMPUTING FILTER COEFFICIENTS FOR ECHO SUPPRESSION

BACKGROUND OF THE INVENTION

Preferred embodiments of the present invention relate to apparatus and methods for computing filter coefficients for an adaptive filter for filtering a microphone signal so as to suppress an echo due to a loudspeaker signal, as may be employed, for example, within the context of conference systems. Examples of conference systems include telephone conference systems, video conference systems or other bi-directional conference systems.

Acoustic echoes arise whenever tones, sounds and noises from a loudspeaker are picked up by a microphone located in the same room or in the same acoustic environment. In telecommunication systems, this acoustic feedback signal is transmitted back to the far-end subscriber, who notices a delayed version of their own speech. In this context, echo signals represent a very distracting disturbance and may even inhibit interactive full-duplex communication. Additionally, acoustic echoes may result in howling effects and other instabilities of the acoustic feedback loop.

WO 2006/111370 A1 relates to a method and an apparatus for removing an echo in a multichannel audio signal. Acoustic echo control and noise suppression are an important part of any hands-free telecommunication system such as telephone, audio or video conference systems. The method, described in the document, of processing multichannel audio loudspeaker signals and at least one microphone signal in this context includes the steps of transforming the input microphone signal to input microphone short-time spectra, computing a combined loudspeaker signal short-time spectrum from the loudspeaker signals, computing a combined microphone signal short-time spectrum from the input microphone signal, estimating a magnitude spectrum or a power spectrum of the echo in the combined microphone signal short-time spectrum, computing a gain filter for magnitude modification of the input microphone short-time spectrum, applying the gain filter to at least one input microphone spectrum, and converting the filtered input microphone spectrum to the time domain.

Echo suppression and echo cancellation systems as are employed today and may also be referred to as echo removal systems in summary, frequently have the problem that they do not cope with different sound, tone and noise components in an optimum manner despite the use of adaptive filters. If one component is predominant as compared to another, a non-optimum suppression of the echo of the loudspeaker signal may occur in the microphone signal of such a communication system, for example. On the other hand, in the case of a deviating composition of the components of the different sources, tonal artifacts may arise due to the utilization of an echo suppression or echo cancellation system, which tonal artifacts are also perceived as extremely annoying.

SUMMARY

According to one preferred embodiment, an apparatus for computing filter coefficients for an adaptive filter for filtering a microphone signal so as to suppress an echo due to a loudspeaker signal may have: extraction means for extracting a stationary component signal or a non-stationary component signal from the loudspeaker signal or from a signal derived from the loudspeaker signal; and computing means for computing the filter coefficients of the adaptive filter on the basis of the extracted stationary component signal or the extracted non-stationary component signal.

According to another preferred embodiment, a method of computing filter coefficients for an adaptive filter for filtering a microphone signal so as to suppress an echo due to a loudspeaker signal in this context may have the steps of: extracting a stationary component signal or a non-stationary component signal from the loudspeaker signal or from a signal derived from the loudspeaker signal, and computing the filter coefficients of the adaptive filter on the basis of the extracted stationary component signal or the extracted non-stationary component signal.

According to still another preferred embodiment, an apparatus for computing filter coefficients for an adaptive filter for filtering a microphone signal so as to suppress an echo due to a loudspeaker signal, may have: echo estimation means for estimating the echo contribution spectrum or echo power spectrum in the microphone signal; extraction means for extracting a stationary component signal and a non-stationary component signal from the loudspeaker signal or from a signal derived from the loudspeaker signal on the basis of the estimated echo contribution spectrum or echo power spectrum in the microphone signal; and computing means for computing the filter coefficients of the adaptive filter on the basis of the extracted stationary component signal and the extracted non-stationary component signal.

According to still another preferred embodiment, a method of computing filter coefficients for an adaptive filter for filtering a microphone signal so as to suppress an echo due to a loudspeaker signal may have the steps of: estimating the echo contribution spectrum or echo power spectrum in the microphone signal; extracting a stationary component signal or a non-stationary component signal from the loudspeaker signal or from a signal derived from the loudspeaker signal on the basis of the estimated echo contribution spectrum or echo power spectrum in the microphone signal; and computing the filter coefficients for the adaptive filter on the basis of the extracted stationary component signal or the extracted non-stationary component signal.

Another preferred embodiment may have a program comprising a program code for performing the above methods of computing filter coefficients for an adaptive filter when the program runs on a processor.

Preferred embodiments of the present invention are based on the finding that improvement of the audio quality may be achieved in that the statistic properties of the loudspeaker signal or of a signal derived from the loudspeaker signal may be improved, within the context of computing the filter coefficients for adaptive filtering for suppressing an echo in the microphone signal, in that the loudspeaker signal is analyzed for its statistic properties. To this end, the loudspeaker signal or a signal derived from the loudspeaker signal is analyzed—in accordance with preferred embodiments of the present invention—for a stationary component and/or a non-stationary component in that one or more corresponding component signals are extracted from the respective loudspeaker signal or from the signal derived therefrom. Computation of the filter coefficients of the adaptive filter is then performed on the basis of the extracted stationary component signal or the extracted non-stationary component signal.

A stationary component of a signal, i.e., for example, of the loudspeaker signal or of a signal derived from the loudspeaker signal, may represent, for example, in a frequency-related domain, an energy-related value which varies only little over time, or may form a corresponding stationary component. A stationary component of such a signal thus maybe determined, for example, in a frequency-related domain in that an energy-related value is determined for a bandpass signal of the respective signal, and in that averaging over the progress in time is performed. Averaging may be conducted as floating averaging, possibly while using different computation specifications. Such a computation may be conducted, for example, in a recursive manner while exploiting an IIR-filter-type structure (IIR=infinite impulse response). Similarly, corresponding averaging may also be conducted using an FIR-filter-type structure (FIR=finite impulse response).

Accordingly, a non-stationary component of the loudspeaker signal or of the signal derived may be determined on the basis of a corresponding bandpass signal of the respective signal. For example, in preferred embodiments of the present invention, the associated non-stationary component signal may be determined, for example, on the basis of the stationary component signal and a gain filter. In preferred embodiments, the gain filter may further depend on at least one control parameter, which in preferred embodiments of the present invention is determined, for example, on the basis of a coherence function which takes into account the loudspeaker signal and the microphone signal, or signals derived therefrom.

In preferred embodiments of the present invention, first filter coefficients may be computed on the basis of the stationary component signal, and second filter coefficients may be computed on the basis of the non-stationary component signal, on the basis of which the filter coefficients for the adaptive filter are eventually determined. This may take place, for example, such that the filter coefficients of the adaptive filter correspond to a series connection of a first filter, which is based on the first filter coefficients, and a second filter, which is based on the second filter coefficients. In preferred embodiments of the present invention it is also possible to determine the filter coefficients either on the basis of first filter coefficients or on the basis of the second filter coefficients.

Further preferred embodiments will be described, in the further course of the present description, with regard to their structures and modes of operation. Depending on the specific preferred embodiment, the stationary component signals and the non-stationary component signals may be signals estimated from the respective signals. Likewise, an apparatus in accordance with a preferred embodiment of the present invention may further comprise suppression filtering means configured to filter the microphone signal on the basis of the filter coefficients.

The above and other elements, features, steps, characteristics and advantages of the present invention will become more apparent from the following detailed description of the preferred embodiments with reference to the attached drawings.

BRIEF DESCRIPTION OF THE DRAWINGS

Preferred embodiments of the present invention will be explained below in more detail with reference to the accompanying drawings. Preferred embodiments of the present invention may therefore be better understood with regard to the following drawings.

DETAILED DESCRIPTION OF THE INVENTION

Before describing, with reference to FIGS. 2 to 15, various preferred embodiments of the present invention which enable acoustic echo suppression while using a separation of stationary and non-stationary signal components, a general setup of an acoustic echo removal problem will initially be illustrated with reference to FIG. 1.

Acoustic echoes arise whenever sounds, tones and noises of a loudspeaker are picked up by a microphone located in the same room or in the same acoustic environment. In telecommunication systems, these acoustic feedback signals are transmitted back to the far-end subscriber, who notices a delayed version of their own speech. In this context, echo signals may represent a very distracting disturbance and may even inhibit interactive full-duplex communication. Additionally, acoustic echoes may result in howling effects and other instabilities of the acoustic feedback loop. In a full-duplex-suitable hands-free telecommunication system, echo control is therefore needed for suppressing the coupling between the loudspeaker and the microphone. FIG. 1 illustrates the acoustic echo problem.

Figure 1:
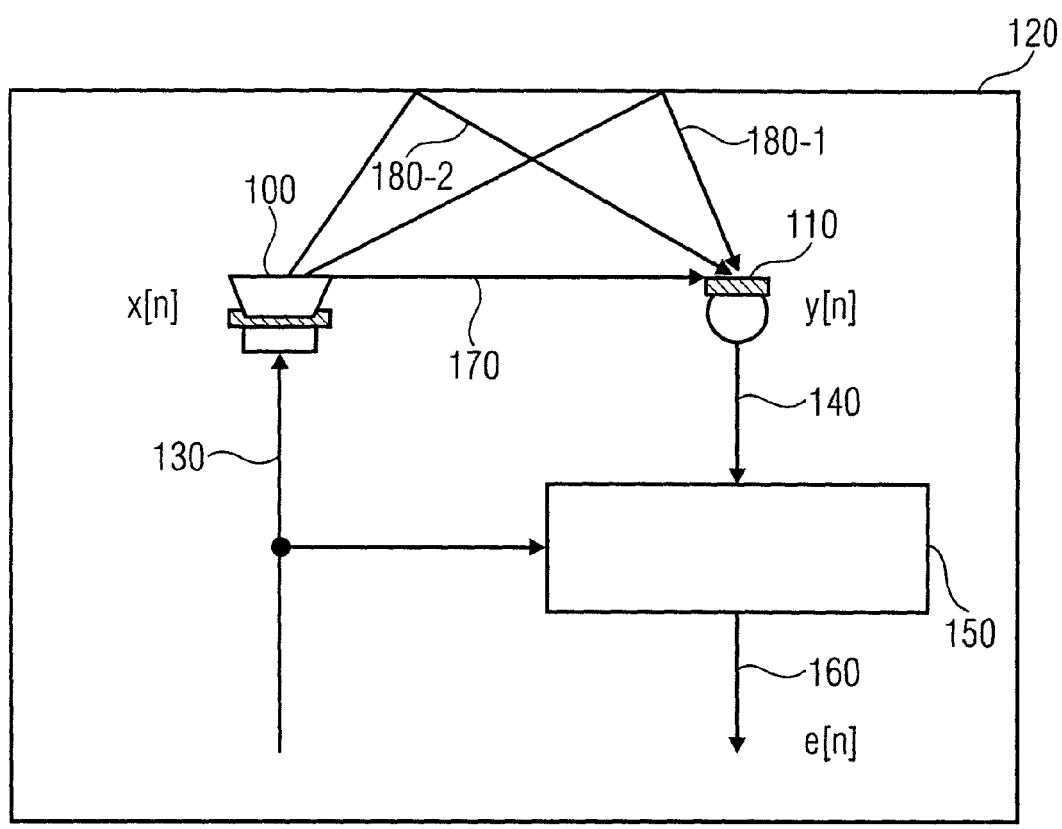
FIG. 1 shows a general setup of an acoustic echo removal problem.

FIG. 1 thus shows a loudspeaker 100, which may be provided, along with a microphone 110, in an acoustic environment 120, which may be a room, for example. Similarly, the acoustic environment 120 may also be the interior of a vehicle.

In this context, a loudspeaker signal 130, which in FIG. 1 is also referred to as x[n] with an integer time index n, is made available to the loudspeaker 100. The microphone 110 picks up the noises, sounds and tones stemming from the acoustic environment 120, and generates a microphone signal 140, which is also referred to as y[n] in FIG. 1. Both the loudspeaker signal 130 and microphone signal 140 are provided as input signals to an echo removal process unit 150, which provides, at an output, an echo-suppressed signal 160 of the microphone signal 140, which is also referred to as e[n] in FIG. 1.

FIG. 1 thus basically illustrates the acoustic echo problem as may arise in bi-directional communication systems. The signal of the far end of the telecommunication system which is output by the loudspeaker reaches the microphone on a direct path 170 and via reflected paths 180-1, 180-2, which are also referred to as indirect paths. For this reason, the microphone 110 does not only pick up the voice at the local, near end, but also registers the echo which is then fed back to the user at the far end.

In other words, the loudspeaker signal x[n] is fed back into the microphone signal y[n]. An echo removal process, performed in the echo removal process unit 150, ideally removes this echo while it allows the voice of the local, near end of the telecommunication system to pass through.

A conventional method of coping with this echo is to place an acoustic echo canceller (AEC) in parallel with the propagation path of the echo signal, as is described in Reference [1]. In such an acoustic echo canceller, a digital replica of the echo signal is estimated and is subsequently subtracted from the measured or observed microphone signal. Standard approaches for cancelling acoustic echoes rely on the assumption that the echo path can be modeled by a linear FIR filter (FIR=finite impulse response), and implement acoustic echo cancellers accordingly, as is also described in Reference [1]. Since the echo path is typically unknown and, moreover, may change during the operation time, the linear filter of such an acoustic echo canceller is typically realized adaptively. To be able to model typical echo paths, use is made of FIR filters of lengths of typically some hundreds of milliseconds—in relation to the respective sampling rate —which also implies a high level of computational complexity.

In practice, the achievable echo attenuations for these conventional approaches are frequently not sufficient for various reasons. The various reasons include, for example, long reverberation times (echo tail effect), which result in undermodeling of the echo path, nonlinear echo components caused, e.g., by vibration effects or the nonlinear behavior of particularly low-cost audio hardware, and convergence problems in case of a high temporal rate of change with regard to the echo paths, as is described in Reference [2]. Therefore, acoustic echo cancellers are combined with nonlinear post-processors to remove residual echoes and echo components which the echo canceller could not eliminate, as is described in Reference [3]. Commonly, the suppression of residual echoes is performed in a frequency-selective way, as is described in Reference [4]. Indeed, virtually all acoustic echo cancellers use such post-processors because they fail too often to sufficiently reduce the echo such that it becomes inaudible.

Recently, a number of acoustic echo suppressors for the subband domain have been proposed in References [5, 6] which bear similarities to the above-mentioned nonlinear post-processors, but have no need for an acoustic echo canceller and for estimating the echo path impulse response. These systems are claimed to be of low computational complexity and to be robust while achieving a high degree of duplexity.

The echoes suppressor scheme proposed in Reference [6] applies a short-time Fourier transform (STFT) to compute spectra of the loudspeaker and microphone signals. A delay value d between the short-time transformed ones of the two signals is applied to the corresponding loudspeaker signal, said delay value being chosen such that most of the effect of the echo path impulse response is taken into account.

Then a real-valued echo estimation filter, which mimics the effect of the initial echo path, is estimated. To obtain an estimated echo magnitude spectrum, the estimated delay value and the echo estimation filter are applied to the loudspeaker spectra. While using the estimate of the echo magnitude spectrum, a real-valued echo suppression filter is computed and applied to the microphone signal spectrum to suppress the echo.

The weakness of the above-mentioned acoustic echo suppression systems is that they do not perform well in connection with loudspeaker signals composed of a mixture of stationary and non-stationary signal components. This is the case, for example, when the far-end speech is recorded in a noisy environment. Then the loudspeaker signal and the echo signal contain the non-stationary far-end speech and the stationary far-end background noise.

Current acoustic echo suppression systems determine only one echo signal removal filter for the loudspeaker signal. Consequently, these approaches do not take into account that echo components with different characteristics cause different types of disturbances in the near-end signals, which therefore should be processed differently.

Figure 2:
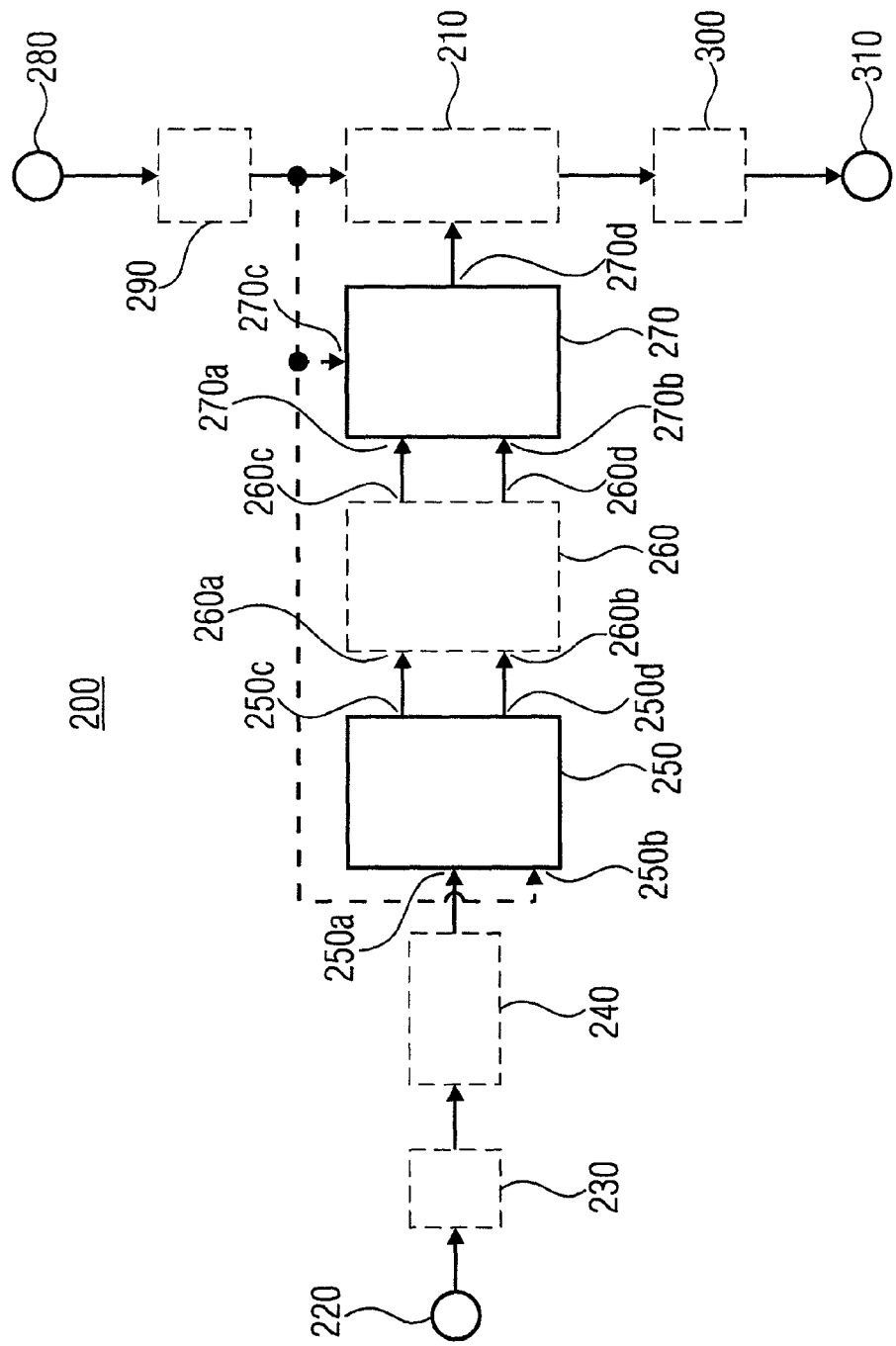
FIG. 2 shows a block diagram of an apparatus for computing filter coefficients in accordance with a preferred embodiment of the present invention.

FIG. 2 shows a first preferred embodiment of an apparatus 200 for computing filter coefficients for an adaptive filter 210, said apparatus utilizing, just like the associated method, a separation of a stationary signal and a non-stationary signal in order to improve echo suppression and, thus, to improve the achievable audio quality. Preferred embodiments of the present invention thus enable different kinds of handling the suppression of signals in accordance with their statistic properties and features, which leads to a more effective echo suppression which is less prone to artifacts.

As an introduction, a block diagram of the apparatus 200 in accordance with a preferred embodiment of the present invention shall initially be explained, before further implementation details shall be explained, in connection with FIGS. 3 to 5, with regard to various preferred embodiments of the present invention. In this context it is useful to point out that even if block diagrams of apparatuses in accordance with preferred embodiments of the present invention are shown and described in the figures, said block diagrams may also be understood as flow charts of corresponding methods which depict the corresponding method steps while indicating the flow directions. In other words, the block diagrams depicted in connection with the present description may also be understood as corresponding flow charts which reflect the individual method steps of the individual means and units.

In addition, it is useful to note at this point that within the context of the present description, identical or similar reference numerals shall be used for means, objects and structures which are identical or similar in function. On the other hand, means, units and objects designated by identical or similar reference numerals comprise identical or similar structural and functional features. In other words, in the present description identical reference numerals designate means, units, and objects which are identical in action, function, structure or similar in action, function or structure. This allows a shorter and more concise representation of the preferred embodiments of the present invention, since description passages may be transferred from one preferred embodiment to another, unless this is explicitly ruled out.

In addition, in the present description, summarizing reference numerals shall be used for means, structures and objects which occur more than once within one figure or preferred embodiment. For example, the two indirect paths 180-1, 180-2 which are shown in FIG. 1 have indeed been given different reference numerals in FIG. 1, but if the indirect paths are designated per se, or if general features of same are described, only the summarizing reference numeral 180 shall be used in the present description. This, too, serves to improve understanding and the conciseness of the present description.

The apparatus 200 as is shown in FIG. 2 includes an input 220 for a loudspeaker signal of a loudspeaker not shown in FIG. 2. The input 220 is coupled, on the input side, to a time/frequency converter means 230, which is depicted in dotted lines in FIG. 2 as an optional component of the apparatus 200. The time/frequency converter means 230 is coupled to an optional first echo estimation filter 240, which as an optional component, however, need not be implemented within the context of the apparatus 200. An output of the echo estimation filter 240 is coupled to an input 250*a* of an extraction means 250, which in turn is coupled, with a first output 250*c* and a second output 250*d*, to an optional second echo estimation filter 260 via the first input 260*a* and a second input 260*b*. This echo estimation filter, too, may be dispensed with, with regard to its implementation, in preferred embodiments of the present invention. For example, in different preferred embodiments of the present invention of an apparatus 200, the first echo estimation filter 240 may be implemented, along with the second echo estimation filter 260, in exactly the same way as an apparatus 200 entirely without any first or second echo estimation filter 240, 260. Of course, implementations wherein only one of the two echo estimation filters 240, 260 is implemented are also possible. Implementation of further components is also possible.

If the second echo estimation filter 260 exists, it will be coupled, with a first output 260*c* and a second output 260*d*, at a first input 270*a* and a second input 270*b* of a computing means 270 for computing the filter coefficients for the adaptive filter 210. The computing means 270 is also coupled, via an output 270*d*, to an input of the adaptive filter 210.

In addition, the adaptive filter 210 is coupled to an input of the adaptive filter 210 via an input 280 for a microphone signal via an optional time/frequency converter means 290. An output of the adaptive filter 210 is coupled to an output for the echo-cancelled microphone signal via an optional frequency/time converter means 300. In addition, the input 280 is optionally also coupled, via the time/frequency converter means 290, to a second input 250*b* of the extraction means 250 and to a third input 270*c* of the computing means 270. These two inputs 250*b*, 270*c* of the extraction means 250 and of the computing means 270, however, are optional and may be implemented independently of each other in various preferred embodiments of the present invention.

The apparatus 200 may be implemented, for example, in the echo removal process unit 150 shown in FIG. 1.

Before the mode of operation of the preferred embodiment, shown in FIG. 2, of an apparatus 200 will be explained in more detail, it should also be mentioned that preferred embodiments of the present invention may basically be implemented both within discrete circuits and within integrated circuits or other, more complex circuits. For example, preferred embodiments of the present invention may also be implemented in data processing means, i.e. processors, integrated systems (SOC=system on chip), application-specific integrated circuits (ASIC) or other integrated circuits and special-purpose processors. In this context, it is quite possible for identical circuit parts of the respective data processing means to be employed in different means in a temporarily consecutive manner. For example, the same logical gate of an arithmetic logic unit (ALU) of a processor may be used, firstly, within the context of the functionality of the extraction means 250, and, secondly, within the context of the functionality of the computing means 270. Nevertheless, the two means differ not least with regard to further features, such as, in the above-mentioned case, with regard to different control commands, which co-define the different means, for example. A partial or complete overlap of circuit-engineering implementations of different means is therefore quite possible.

It is not least for this reason that in the present description means, components and structures which are coupled to one another are understood as means, components and structures which are indirectly or directly interconnected. If there is an implementation based on data processing means, for example, a coupling may be conducted by means of a storage location of a memory which has an intermediate result in the form of a signal latched therein.

In addition, however, preferred embodiments of the present invention are basically not limited to digital implementations, even if mainly digital implementations will be described in the further course of the description. For example, an analog implementation or a mixed implementation comprising analog and digital components is feasible, in principle. In such a case, additional A/D or D/A converters (analog/digital and digital/analog converters) may be employed, for example, so as to possibly perform a transform of the signals of one type to the other.

With regard to the mode of operation of the apparatus 200 as is depicted in FIG. 2, a loudspeaker signal made available at the input 220 of the apparatus 200 is possibly transformed to a frequency-related domain by the time/frequency converter means 230 which is optionally present. The time/frequency converter means 230 ensures, in the case of an implementation operating on data blocks (frames), a conversion to a spectral representation of the respective data block, so that the spectral representation provided at the output of the time/frequency converter means 230 corresponds to the data block in the time domain. Depending on the specific implementation, a Fourier transformation-based converter means, a subband-based converter means or a QMF-based converter means (QMF=quadrature mirror filter) may be used within the context of the time/frequency converter means 230. Irrespective of the precise mode of operation of the implemented time/frequency converter means 230, said converter means 230 converts the signal (present in the time domain) provided at its input to a plurality of bandpass signals. Each bandpass signal has a characteristic frequency associated with it, which may be, for example, a center frequency, a lower cutoff frequency of the respective band or an upper cutoff frequency of the respective band, for example. Depending on the specific implementation, the individual bandpass signals may have more than one characteristic frequency or a further characteristic parameter associated with them.

The first echo estimation filter 240 represents a possibility of modulating the acoustic environment 120 (of FIG. 1), so that a signal is present at its output which ideally comprises a magnitude spectrum which corresponds to the signal that would be picked up by the microphone signal on account of the loudspeaker signal. As was already explained above, however, the first echo estimation filter 240 is an optional filter which may possibly not be implemented.

The loudspeaker signal or the signal which is optionally processed, filtered and therefore derived accordingly by the optional components 230, 240 is now provided to the extraction means 250 at its the first input. The extraction means 250 is configured to generate a stationary component signal and a non-stationary component signal from the loudspeaker signal or from the signal derived from the loudspeaker signal. As shall be seen in the further description of preferred embodiments of the present invention, this may be effected, for example, by averaging the incoming signal so as to determine the stationary component signal, for example.

Depending on the specific implementation, the signal may be an estimated signal which deviates from an "actual" stationary component. Accordingly, a non-stationary component, or a non-stationary component signal, may be determined from the stationary component signal, possibly while using a gain filter not depicted in FIG. 2.

In other preferred embodiments of the present invention, the extraction means 250 may also use a different steady-state measure than the one described, for example.

With regard to the non-stationary component, or the non-stationary component signal, said component or signal may also be determined, for example, by a comparison of the temporal change in the input signal. Also, in the case of the implementation of a voice codec within the context of the apparatus 200 or in the surroundings of the apparatus 200, a prediction measure may possibly be used, in the extraction means 250, for extracting at least one of the two signals mentioned. Such a prediction measure may represent, for example, the error signal of an LPC codec (LPC=linear predictive coding).

The extraction means 250 comprises the two outputs which were already described above and where different signals may be provided, depending on the implementation. For example, at least the stationary component signal or the non-stationary component signal is typically provided at the first output of the extraction means 250. The other one of the two component signals, or a signal comprising information with regard to the signal output at the first output, may possibly be provided at the second output. This may be, for example, parameters for the further processing of the respective signal in the computing means 270, or this may only be a control signal which indicates which one of the two component signals is transmitted.

The optional second echo estimation filter 260 generally corresponds to the first echo estimation filter 240 with regard to functionality. The second echo estimation filter 260, too, generally is capable, provided that it is implemented to perform an echo estimation in this manner, to estimate the loudspeaker signal provided at the input 220 such as to obtain a signal which would correspond to the signal registered by the microphone, provided that, ideally, no further sources of noise are present. The first echo estimation filter 240 as well as the second echo estimation filter 260 may optionally comprise a delay means which takes into account a delay of the echo of the loudspeaker which is picked up by the microphone. In other words, the filters 240, 260 may also be used for delaying the loudspeaker signal or the signal derived therefrom, either by an additional implementation of a delay means or on account of their internal structures. Generally, a separation of the two functionalities of the echo estimation, on the one hand, and of the delay, on the other hand, is additionally also possible, of course, in that e.g. the first echo estimation filter 240 is used only for delaying the respective signal, whereas the second echo estimation filter 260 performs the actual echo estimation.

The signals provided by the second echo estimation filter 260 are then provided to the computing means 270, which in turn is configured to compute or to determine the filter coefficients for the adaptive filter 210 on the basis of the extracted stationary component signal or the extracted non-stationary component signal. Depending on the specific implementation, the computing means 270 may also fall back, for this purpose, on the microphone signal provided at the input 280, or on the microphone signals transferred to the frequency-related domain. This signal is possibly also available to the extraction means 250, as will be described in more detail below.

The adaptive filter 210, which obtains the filter coefficients from the computing means 270, then performs the actual spectral modification of the microphone signal so as to provide, at its output, an at least partially echo-cancelled version of the microphone signal for further processing. Depending on the specific implementation, the microphone signal which has been echo-cancelled or spectrally modified in this manner may be converted back to the time domain via the frequency/time converter means 300, or may be output directly at the output 310. For example, an inverse transformation to the time domain by the converter means 300 may not be useful when, for example, the corresponding microphone signal is encoded in the frequency domain or a frequency-related domain anyhow.

Before individual components of the block diagram, shown in FIG. 2, of the apparatus 200 will be described in more detail in connection with FIGS. 3a to 5e, it shall be noted at this point that processing of the loudspeaker signal or of the signal derived from the loudspeaker signal may be generally performed in the frequency-related domain such that an individual associated bandpass signal, a plurality of bandpass signals, a multitude of bandpass signals or all of the bandpass signals are processed accordingly.

It shall also be noted that the individual means and filters may operate while using energy-related values, for example, depending on the specific implementations. An energy-related value is a value which is formed as a power of a real base value with an even-numbered exponent, or is formed as a power of a magnitude of a value (absolute value) with any power. If, for example, short-time spectra are processed in the individual filters or in the individual means, said spectra may operate on energy-related values, for example, on energy values which are formed as magnitude squares of the associated spectral coefficients. Likewise, magnitude spectra, i.e. absolute values of the respective spectral coefficients, may be used with the exponent 1. In other words, values which are proportional to $|z|^m$, m being a positive number, for example a natural number, may be used, as energy-related values, starting from any value z, which is a real-valued or complex-valued value. In the case of a real-valued value z, values which are proportional to $z^{2m}$ may additionally be used as energy-related values.

Figure 3A:
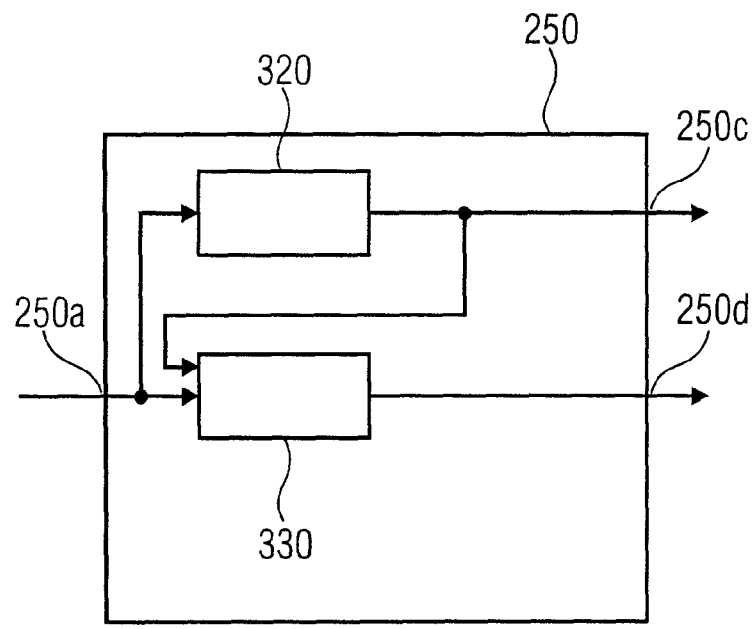
FIGS. 3a to 3c show block diagrams of different extraction means in accordance with preferred embodiments of the present invention.

FIG. 3a shows a block diagram of the extraction means 250 in accordance with a preferred embodiment of the present invention, as may be implemented in the context of the apparatus 200. The extraction means 250 merely comprises a first input 250a, which is coupled to the output of the optional first echo estimation filter 240 in FIG. 2. The extraction means 250, as is shown in FIG. 3a comprises no second input, however (input 250b in FIG. 2).

The first input 250a of the extraction means 250 is coupled to an averaging means 320 configured to determine a mean value of the signal provided at the input 250a. The term signal here comprises not only signals in the time domain (time signals), but also signals in the frequency domain or a frequency-related domain, wherein the respective signals are spectral representations of signals in the time domain. Likewise, signals may also comprise and transmit information derived from the previously mentioned signals, such as magnitudes of values in the frequency domain (spectral amplitude), energy values (magnitude squares), spectra and other derived values and quantities.

At an output of the averaging means 320, said signal which is provided at the input 250a is output, in the extraction means 250 shown in FIG. 3a, as a stationary component signal at a first output 250c of the extraction means 250. As is also shown in FIG. 2, the first output 250c is coupled to the optional second echo estimation filter 260 and/or to the computing means 270.

The signal provided at the first input 250a is further provided, along with the stationary component signal provided at the output of the averaging means 320, to a gain filter 330 which outputs the non-stationary component signal at an output, and forwards it to the second output 250d of the extraction means 250. The gain filter 330 is configured to determine the non-stationary component signal on the basis of the loudspeaker signal incoming at the first input 250a, or of the signal derived therefrom, as well as of the stationary component signal. With regard to the further functionality of both the averaging means 320 and the gain filter 330, reference shall be made to the above explanations given with regard to FIG. 2, and to the further explanations given in the further course of the present description.

Figure 3B:
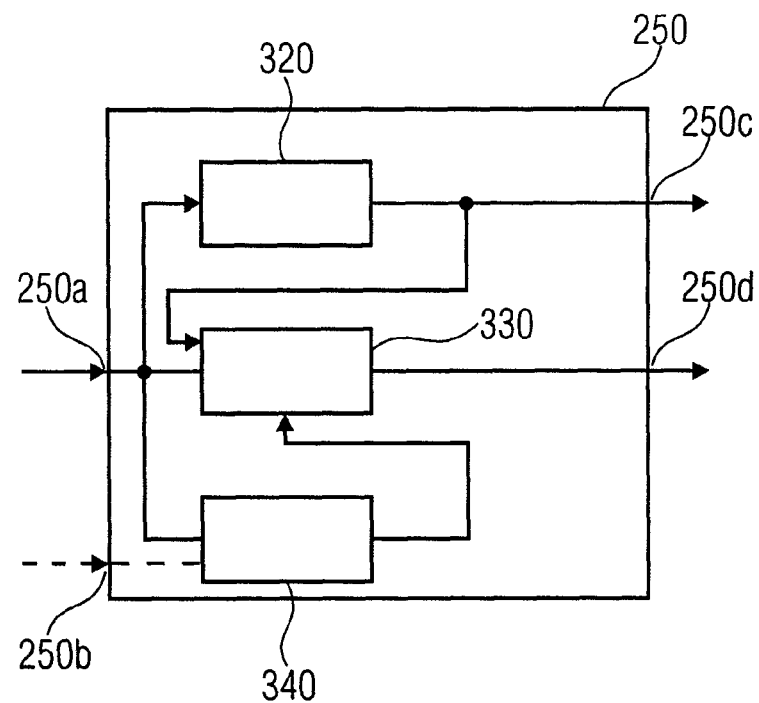

FIG. 3b shows a further extraction means 250 as may be employed in a preferred embodiment of the present invention in an apparatus 200. The extraction means 250 shown in FIG. 3b differs from the one shown in FIG. 3a essentially in that the one shown in FIG. 3b further comprises a parameter computing means 340 which is also coupled, on the input side, to the first input 250a. With an output, the parameter computing means 340 is coupled to the gain filter 330, which has a control parameter provided to it by the parameter computing means 340 for computing the non-stationary component signal. For more specific details with regard to the mode of operation, reference shall be may to the description which follows.

As an optional component, the extraction means 250 shown in FIG. 3b further comprises the second input 250b already depicted in connection with FIG. 2 which is possibly indirectly coupled, on the one hand, to a further input of the parameter computing means 340, and on the other hand, as is also shown in FIG. 2, to the input 280 for the microphone signal. In the present case, the indirect coupling may possibly be effected while utilizing the time/frequency converter means 290. Also with regard to the mode of operation of the parameter computing means 340, reference shall be may to the description which follows.

Figure 3C:
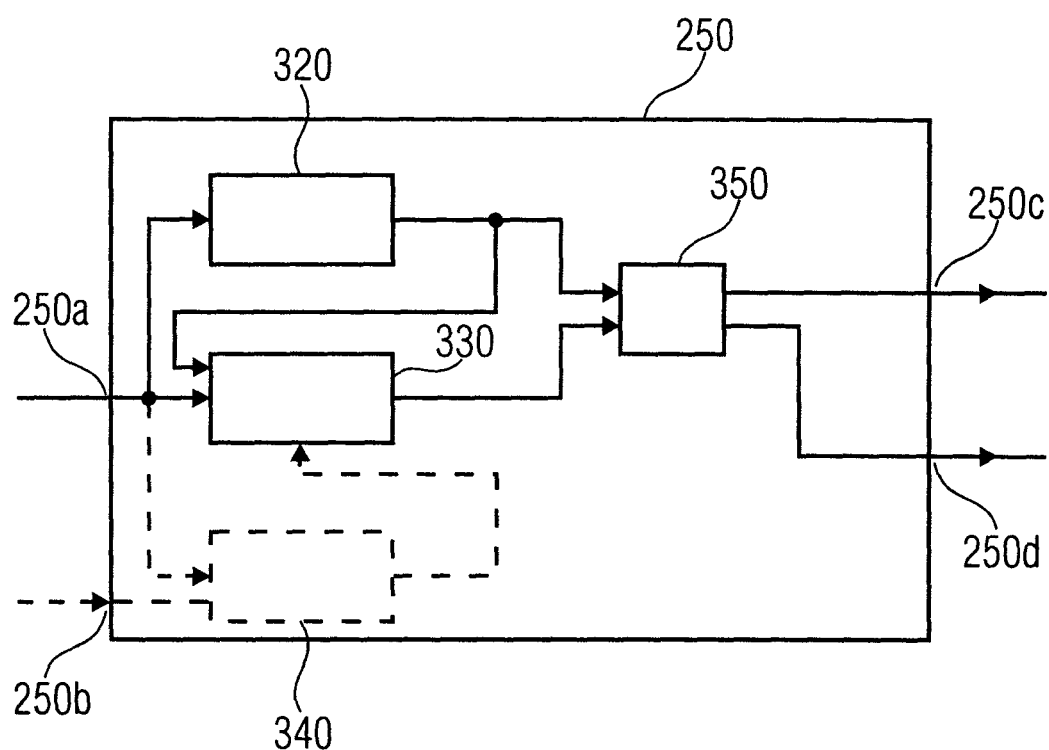

FIG. 3c shows a further potential implementation of an extraction means 250 as may be employed in the apparatus 200 of FIG. 2. The extraction means 250 shown in FIG. 3c here is based on that shown in FIG. 3b, the parameter computing means 340 being also shown, along with its connections, as an optional component. Unlike the extraction means 250 shown in FIG. 3b, the extraction means 250 shown in FIG. 3c comprises a distribution means 350 which is coupled, with one input in each case, to the outputs of the averaging means and of the gain filter 330, respectively. The distribution means 350 has both the stationary component signal of the averaging means 320 and the non-stationary component signal of the gain filter 330 provided to it.

On the output side, the distribution means 350 is coupled both to the first output 250c and to the second output 250d of the extraction means 250. The distribution means 350 is implemented to decide, on the basis of the two component signals made available to it, which of the two will be provided to the subsequent component via the first output 250c. Depending on which of the two component signals is concerned, the distribution means 350 further outputs a control signal via the second output 250d of the extraction means 250, said control signal comprising, for example, information on which of the two component signals is present at the first output 250c, or the distribution means 350 outputs a corresponding control signal which comprises parameters for the further processing of the component signal output. With regard to the different parameters which may be transmitted, for example, within the context of the control signal, reference shall be may to the description which follows.

Depending on the specific implementation, the distribution means 350 may be implemented such that it transfers that component signal to the first output 250c which comprises a higher loudness, a higher energy or a higher energy value as compared to the other component signal. Different component signals may be output for different band signals, for example.

The extraction means 250 shown in FIG. 3c thus differs from those shown in FIGS. 3a and 3b not least in that only one of the two component signals is output at the first output 250c of the extraction means 250. As was already explained in connection with FIG. 2, only a control signal which comprises information with regard to the component signal output at the first output 250c is output by the extraction means 250 shown in FIG. 3c.

Figure 4A:
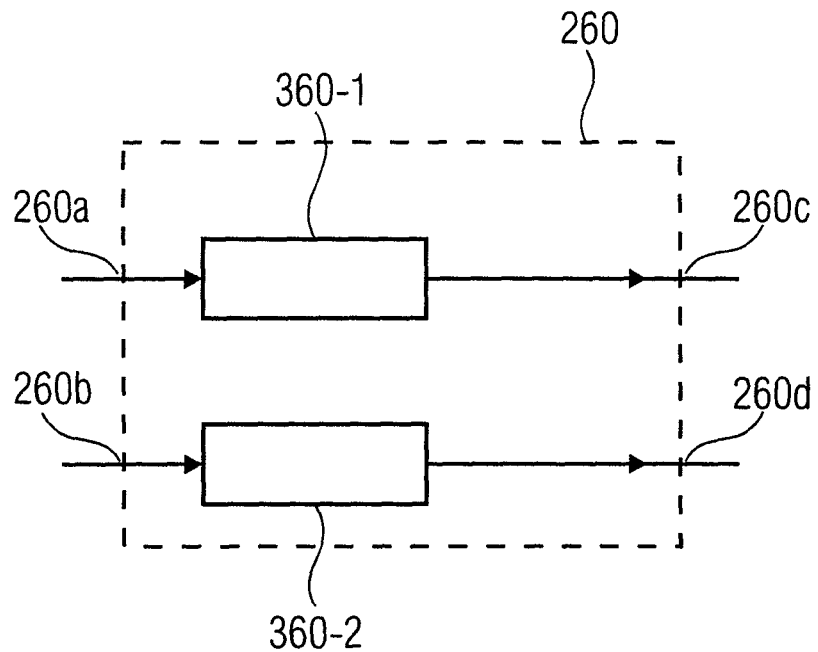
FIGS. 4a and 4b show block diagrams of an optional echo estimation filter in accordance with preferred embodiments of the present invention.

FIG. 4a shows a first preferred embodiment of the second echo estimation filter 260, as is also shown as an optional component in FIG. 2. The optional second echo estimation filter 260 comprises two filter stages 360-1, 360-2, which are each coupled, with an input, to an input 260a, 260b, respectively, of the second echo estimation filter 260. The two filter stages 360-1, 360-2 are additionally coupled, with an output, to an output 260c, 260d, respectively, of the second echo estimation filter 260.

The optional second echo estimation filter 260 shown in FIG. 4a in this context is one which may be employed in connection with the extraction means 250 shown in FIGS. 3a and 3b. More specifically, the second echo estimation filter 260 shown in FIG. 4a enables parallel processing both of the stationary component signal by the filter stage 360-1 and of the non-stationary component signal by the filter stage 360-2. The two filter stages 360-1, 360-2 may generally be configured to be identical or different, depending on whether different echo estimation filters are to be employed for modulating the acoustic environment 120 (as shown in FIG. 1) for the stationary and non-stationary component signals. Naturally, the two filter stages 360-1, 360-2 may also be realized, in terms of circuit engineering, by the same circuit elements, for example when latching or buffering of the one signal is also implemented.

As was already explained in connection with discussing the possibility of the two-fold implementation of the echo estimation filters 240, 260 in connection with FIG. 2, the filter stages 360 may also be filter stages which merely realize a delay, for example. Of course, use may also be made, within the context of the second echo estimation filter 260, of other filter stages than the echo estimation filter stages described. The filter stage 360, for example, comprises an optional control input for receiving control signals so as to implement the filtering effect such that it may be adjusted or influenced.

Figure 4B:
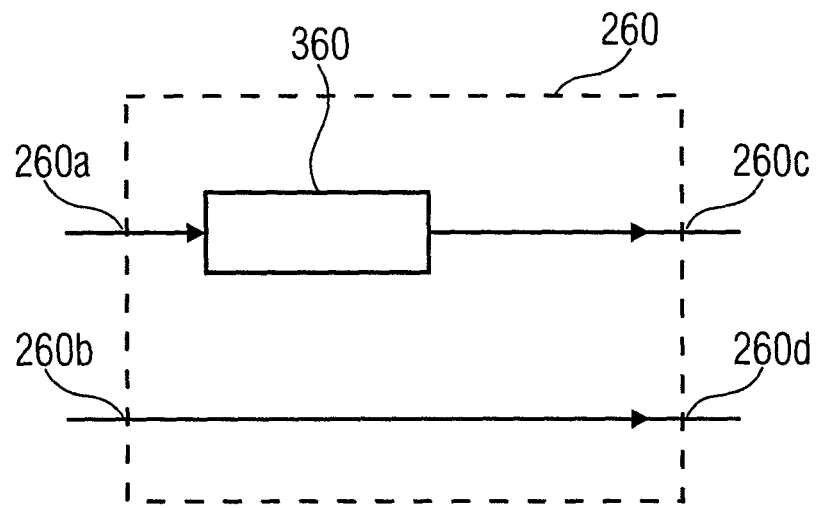

FIG. 4b shows a further form of implementation of the optional second echo estimation filter 260, which differs from that shown in FIG. 4a merely in that only one filter stage 360 is implemented, which is connected between the first input 260a and the first output 260c. In the preferred embodiment shown in FIG. 4, the signal incoming at the second input 260b is transferred to the second output 260d.

The second echo estimation filter 260 shown in FIG. 4b thus may be employed, for example, within the context of an extraction means 250 as is represented in FIG. 3c. In this case, the control signal, which comprises the information on the component signal incoming at the first input 260a, is not modified by the echo estimation filter 260.

Of course, the echo estimation filter shown in FIG. 4b may also be implemented, in one preferred embodiment, with the extraction means 250 shown in FIGS. 3a and 3b, for example when only one of the two component signals is to be modified by the filter stage 360. Here, use may also be made, of course, of a mirrored version of the echo estimation filter 260, which filters the signal incoming at the second input 260b.

Figure 5A:
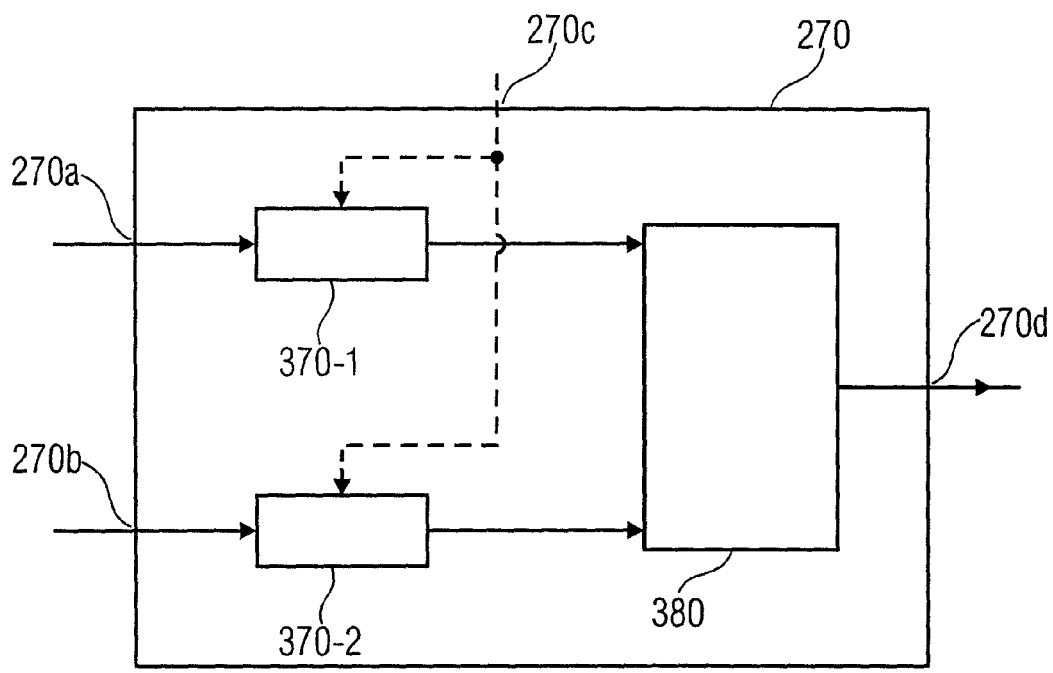
FIGS. 5a to 5e show block diagrams of computing means in accordance with various preferred embodiments of the present invention.

FIG. 5a shows an implementation of a computing means 270 in accordance with a preferred embodiment of the present invention, as may be employed in connection with the apparatus 200 of FIG. 2. Again, the computing means 270 here comprises the first input 270a and the second input 270b. The computing means 270 further comprises first and second filter computing means 370-1, 370-2, which are coupled, on the input side, to one of the two inputs 270a, 270b, respectively, of the computing means 270. More specifically, the filter computing means 370-1 is coupled, on the input side, to the first input 270a so as to receive, for example, the stationary component signal. Accordingly, the second filter computing means 370-2 is coupled to the second input 270b so as to receive the non-stationary component signal from the extraction means 250, as is implemented, for example, in accordance with FIG. 3a or 3b. In the event that the second echo estimation filter 260 is connected between the extraction means 250 and the computing means 270, a signal derived from the respective component signals is fed to both filter computing means 370.

With one output, the two filter computing means 370 are coupled to a combination means 380, which for its part is coupled, on the output side, to the output 270d. As an optional component, the computing means 270 shown in FIG. 5a further comprises the third input 270c, which is coupled, within the computing means 270, to both filter computing means 370 and, as is also shown in FIG. 2, is directly or indirectly coupled to the input 280 for the microphone signal.

With regard to the mode of operation of the computing means 270, both filter computing means 370 are configured to compute, on the basis of the component signals made available to them and, optionally, while taking into account the microphone signal from the input 280, corresponding filter coefficients which they subsequently make available to the combination means 380. If the two filter computing means 370 have signals derived from the respective component signals made available to them which are possibly modified by the second echo estimation filter 260, the filter computing means 370 perform the respective computations on the basis of these signals. Irrespective of this, however, the filter computing means 370 are thus configured to compute first and second filter coefficients, respectively, on the basis of the component signals provided by the extraction means 250.

The first and second filter coefficients computed in this manner are then combined into a set of filter coefficients by the combination means 380, and are then provided as input data to the adaptive filter 210 via the output 270d of the computing means 270. The combination may be accomplished by a plurality of different operations. Depending on the filter technology actually implemented, which not least depends also on the time/frequency converter means 230, 290 used and on the associated frequency/time converter means 300, a multitude of different possibilities of combining the first filter coefficients and the second filter coefficients are possible in order to obtain the filter coefficients for the adaptive filter 210. Corresponding examples will be explained in more detail in the further course of the description.

Figure 5B:
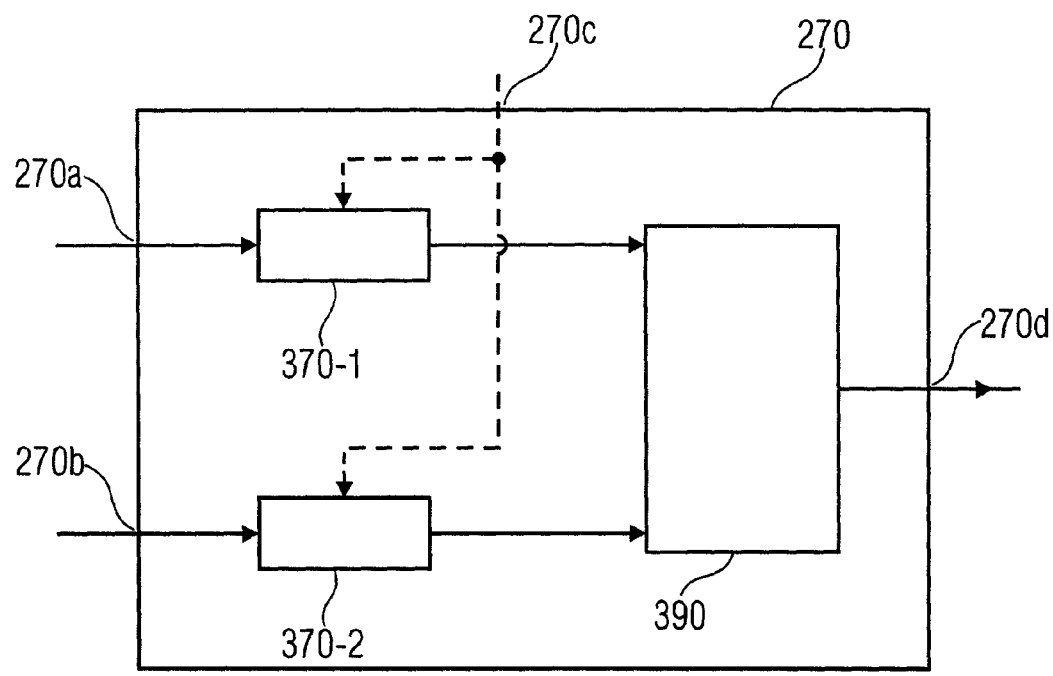

FIG. 5b shows a second computing means 270, which is very similar to that of FIG. 5a. It differs from the computing means 270 shown in FIG. 5a merely in that a selecting means 390 is now implemented instead of the combining means 380 of FIG. 5a, said selecting means 390 being implemented to output, on the basis of the first filter coefficients and the second filter coefficients, a set of filter coefficients at the output 270d, which is either based on the first filter coefficients of the first filter computing means 370-1 or on the second filter coefficients of the second filter computing means 370-2. Put differently, the selecting means 390 is implemented to determine the filter coefficients for the adaptive filter 210 either on the basis of the stationary component signal or of the non-stationary component signal.

Here the selecting means 390 may quite possibly perform more complex mathematical relations on the basis of the respective set of filter coefficients of the computing means 370. However, it differs from the combination means 380 of the computing means 270 of FIG. 5a in that it merely takes into account a set of the two sets of filter coefficients output by the filter computing means 370.

Figure 5C:
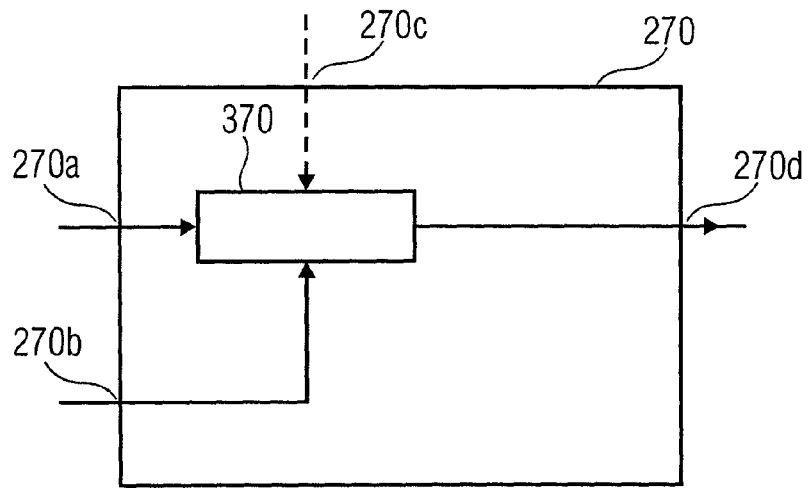

FIG. 5c shows a further computing means 270, which differs from the computing means 270 shown in FIG. 5a in that the computing means 270 of FIG. 5a merely comprises a filter computing means 370, which is coupled to the first input 270a of the computing means 270. Additionally, in the computing means 270 shown in FIG. 5c, the filter computing means 370 is coupled to the second input 270b and is implemented to obtain, via same, parameters for determining the filter coefficients. Also, as an optional component, the filter computing means 370 of FIG. 5c may also be coupled to the third input 270c so as to perform the filter coefficient computation possibly on the basis of the microphone signal.

The computing means 270 shown in FIG. 5c thus corresponds to such a computing means which may be operated in connection with the extraction means 250 shown in FIG. 3c, and possibly with the second echo estimation filter 260 shown in FIG. 4b. Via the second output 250d of the extraction means 250, corresponding parameters for computing within the context of the filter computing means 370 are directly transmitted to the respective filter computing means 370 via the second input 270b of the computing means 270. For this purpose, the second input 270b is coupled to a parameter input of the filter computing means 370, via which parameter input said filter computing means 370 may receive additional parameters for computing the filter coefficients.

Due to the fact that with this computing means 270, only one single filter computing means 370 is implemented, a combination means and a selecting means may be dispensed with.

Figure 5D:
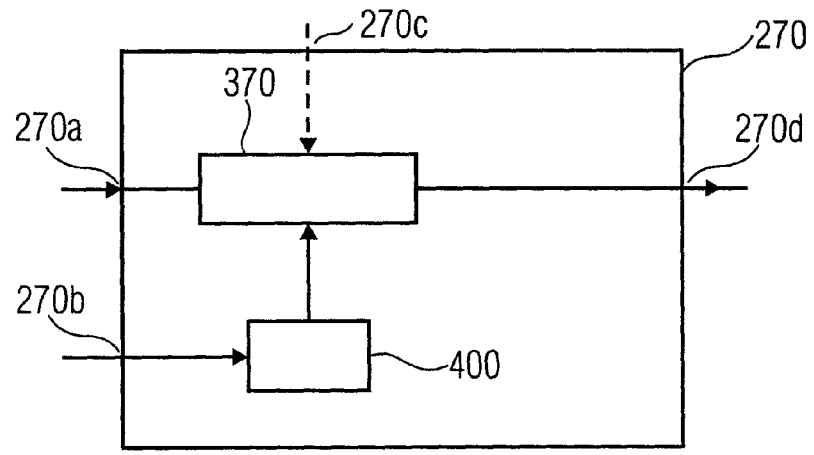

FIG. 5d shows a further computing means 270, which is very similar to that of FIG. 5c with regard to structure and mode of operation. Unlike the computing means 270 shown in FIG. 5c, that depicted in FIG. 5d further comprises a parameter determining means 400 coupled between the second input 270b and the corresponding parameter input of the filter computing means 370.

Unlike the computing means 270 shown in FIG. 5c, the computing means 270 shown in FIG. 5d may be operated in the context of apparatuses 200, wherein the extraction means 250 provides, via the second output 250d, a control signal which merely comprises information on which of the two component signals is output by same via the corresponding first output 250c. If the specifications, used within the context of the filter computing means 370, for computing the filter coefficients for the two component signals, or if the signals based on same, merely differ with regard to parameters, the respective parameter(s) may be computed, depending on the component signal transmitted, by the parameter determining means 400 while making use of the computing means 270 as is depicted in FIG. 5d. The parameter determining means 400 may therefore be implemented, for example, as a memory or as a computing circuit. If it is implemented as a memory, read-only memories (ROM), non-volatile memories (NVM) or random access memories (REM) are possible.

Figure 5E:
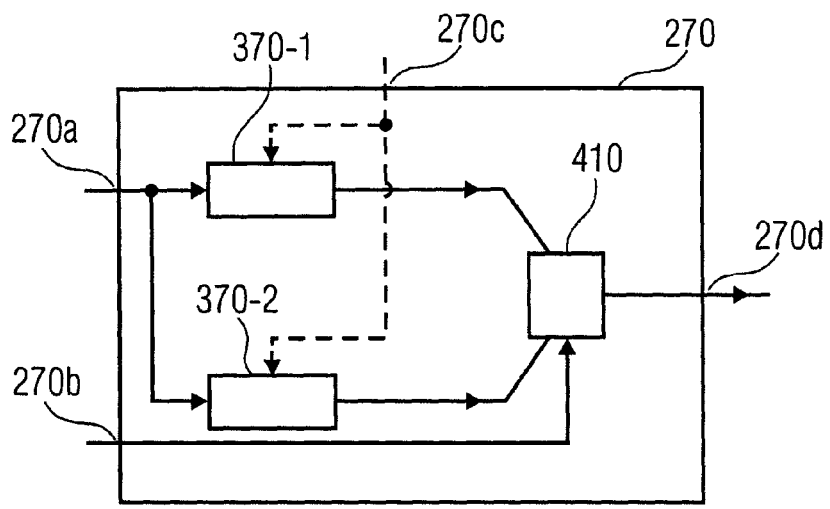

FIG. 5e shows a further computing means 270 which comprises two filter computing means 370-1, 370-2, depending on the component signal on the basis of which the filter coefficients for the adaptive filter 210 are to be computed. Here, both filter computing means 370 are coupled, on the input side, to the first input 270a. In addition to the optional coupling at the optional third input 270c, both filter computing means 370 are each coupled to an input of a distribution point 410, respectively, which distribution point is coupled, with an output, to the output of the computing means 270. The distribution point 410 additionally comprises a control input, which is coupled to the second input 270b of the computing means 270.

The computing means 270 of FIG. 5e thus enables computing the first set of filter coefficients on the basis of the filter computing means 370-1, and computing a second set of filter coefficients on the basis of the second filter computing means 370-2 on the basis of the signals incoming at the first input 270a. The selection as to which filter coefficients of the two filter coefficients computed by the filter computing means 370 are finally forwarded to the output 270d is made in dependence on the signal which is forwarded to the control input of the distribution point 410 via the second input 270b. In dependence on the control signal at its control input, the distribution point 410 couples one of the two inputs to the output 270d.

The computing means 270 of FIG. 5e may thus be operated, for example, in connection with the extraction means 250 as is shown in FIG. 3c, wherein a control signal is transmitted, via the second output 250d, which includes information on the component signal transmitted via the first output 250c. The computing means 270 shown in FIG. 5c may thus be implemented, for example, when the computing specifications for the two component signals which are used in the context of the filter computing means 370 differ to such an extent that they cannot be converted efficiently by a simple change in parameters.

Of course, it should be noted here that the various extraction means 250 as are described in FIGS. 3a to 3c, the various echo estimation filters 260 as are described in FIGS. 4a and 4b, and the various computing means 270 as are described in FIGS. 5a to 5e may be mutually combined with regard to individual aspects. For example, a means which in addition to performing a selection of the filter computing means 370 to be coupled to the output 270d performs a further manipulation, e.g. a computation, on the basis of the filter coefficients, may be used, for example, in the computing means shown in FIG. 5e instead of the distribution point 410.

Preferred embodiments of the present invention as were already described in FIGS. 2 to 5 represent a novel technique that enables separate suppression of stationary and non-stationary echo components. This is achieved by estimating the echo separately from the fluctuating and stationary components of the loudspeaker signal. Then, two corresponding echo removal filters are computed for both signal types in preferred embodiments of the present invention. The echo removal filters may be optimized individually in order to achieve the best echo suppression performance possible while minimizing artifacts and disturbances of the near-end signal.

The further description is organized as follows. Initially a model for the loudspeaker signal is proposed. Subsequently, according to this model, stationary and non-stationary components are separated, which may be conducted on the basis of an estimation of the stationary components. Then the power spectra of the stationary and non-stationary echo components are estimated on the basis of the echo estimation filters. Correspondingly, in some preferred embodiments of the present invention, two echo removal filters are computed. Subsequently, separation of the stationary and non-stationary components may be adapted on the basis of an analysis of an a posteriori performance of the echo removal filters.

With regard to signal modeling it is to be stated that an estimation of the echo contribution spectrum or of the echo power spectrum using an echo estimation filter is typically not very accurate under practical conditions, since only a fraction of the true echo path length can be considered. To prevent that these accuracies result in residual echoes, echo removal filters are computed such that they aggressively suppress echoes, so that no residual echoes remain. This is achieved by overestimating the echo power spectrum and by performing time-smoothing, which favors small gain filter values.

When the loudspeaker signal contains stationary noise, the echo suppressor will attempt to suppress the echo of said stationary noise. Due to the above-mentioned aggressive echo suppression filters, this very frequently leads not only to the suppression of the stationary noise echo, but also to impairment of the stationary near-end noise and near-end speech.

Figure 6:
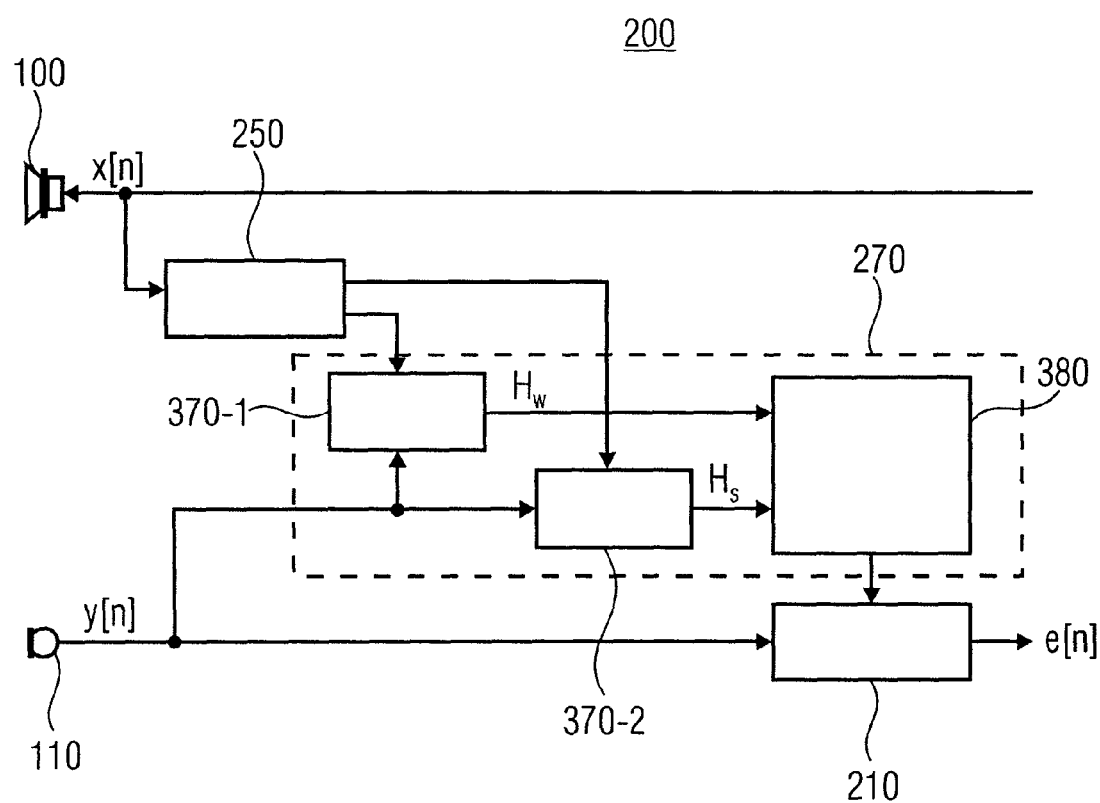
FIG. 6 shows a block diagram of a further preferred embodiment in accordance with the present invention.

The approach proposed here mitigates this problem by using two different echo suppression paths for stationary and non-stationary signals, respectively, as is also illustrated in FIG. 6.

FIG. 6 shows a block diagram of an apparatus 200 in accordance with a preferred embodiment of the present invention, comprising a loudspeaker 100 and a microphone 110. The loudspeaker 100 has a loudspeaker signal x[n] made available to it, which is provided to an extraction means 250. The extraction means 250 is also referred to as a steady-state discriminator (stationary discrimination). As was already explained in connection with FIG. 2, the extraction means 250 comprises two outputs, which are coupled to the computing means 270. In addition, the computing means 270 also has the signal y[n] of the microphone 110 made available to it.

As was also shown in FIG. 5a, the computing means 270 comprises a first filter computing means 370-1 for the stationary component signal, and a filter computing means 370-2 for the non-stationary component signal, which are output by the extraction means 250. In addition, both filter computing means 370 are provided with the microphone signal, respectively.

On the basis of the signals made available to them in each case, both filter computing means 370 compute filter coefficients $H_w$ and $H_s$, which are provided to a combination means 380. To this end, both filter computing means 370 are coupled to the combination means 380 with one output, respectively. The combination means 380, for its part, outputs, to an adaptive filter 210, the filter coefficients which have been computed or determined on the basis of the two sets of filter coefficients $H_w$ and $H_s$.

In order to eventually obtain an echo-suppressed signal e[n] from the microphone signal y[n], the adaptive filter 210 is additionally coupled to the microphone so as to receive the microphone signal at an input. The echo-suppressed signal e[n] is present at an output of the adaptive filter 210.

The adaptive filter 210 thus conducts the actual echo suppression, wherein the two filter computing means 370 each compute echo removal filters in the form of corresponding filter coefficients, which are then combined into the effective echo removal filter by the combination means 380.

With regard to the representation in FIG. 6 it is to be noted that the block diagram depicted in FIG. 6 is a simplified block diagram wherein e.g. time/frequency converter means which are possibly implemented, as well as echo estimation filters are not shown in order to simplify the representation.

Non-stationary (speech) echoes should be suppressed aggressively in order to avoid residual echoes which in this case might be perceived as annoying. Stationary echoes, however, which might stem from stationary noise in the loudspeaker signals, are typically suppressed in a less aggressive manner so as to prevent artifacts such as tonal disturbances.

In order to generate a suitable model, the signal x[n], which is emitted by the loudspeaker, may be split in accordance with $$x[n]=x_s[n]+x_w[n] \quad (1)$$

where $x_s[n]$ models the contributions of the non-stationary speech, and $x_w[n]$ models the contributions of the stationary noise. The discrete time index is denoted by the variable n.

With regard to the separation of the stationary and non-stationary components, a short-time Fourier analysis (SIFT) is initially performed on both sides of the model indicated in equation (1), which yields $$X[k,m]=X_s[k,m]+X_w[k,m], \quad (2)$$

where m denotes a frequency and k is a temporal data block index. Both m and k are integers. In equation (2) the non-stationary and stationary components of the loudspeaker power spectrum $|X[k, m]|^2$ are denoted by $|X_s[k, m]|^2$ and $|X_w[k, m]|^2$. It is reasonable to assume that $x_s[n]$ and $x_w[n]$ are uncorrelated and have a mean value approaching zero.

It then follows that $|X[k, m]|^2$ is given by $$|X[k,m]|^2 \approx |X_s[k,m]|^2 + |X_w[k,m]|^2. \quad (3)$$

For this reason, the instantaneous power spectrum of the non-stationary component signal $|\hat{X}_s[k, m]|^2$ of the loudspeaker signal $x_s[n]$ may be recovered by subtracting an estimate of the power spectrum of the stationary component signal $|X_w[k, m]|^2$ from the power spectrum of the loudspeaker signal $|X[k, m]|^2$ in accordance with $$|\hat{X}_s[k,m]|^2 = |X[k,m]|^2 - |\hat{X}_w[k,m]|^2. \quad (4)$$

In practice, $|\hat{X}_s[k, m]|^2$ is estimated by filtering the power spectrum of the loudspeaker signal $|X[k, m]|^2$ in accordance with $$|\hat{X}_s[k,m]|^2 = F_x[k,m]^2 |\hat{X}_w[k,m]|^2. \quad (5)$$

The filter $F_x[k,m]$, which is also referred to as a gain filter, can be written in its generic form, in accordance with Reference [7], as follows $$F_x[k, m] = \left[ \frac{|X[k, m]|^{\gamma_x} - \beta_x |\hat{X}_w[k, m]|^{\gamma_x}}{|X[k, m]|^{\gamma_x}} \right]^{\frac{1}{\gamma_x}}, \quad (6)$$

where $\gamma_x$ is an exponent and $\beta_x$ is a control parameter, or parameter for controlling the intensity of the suppression of the stationary signal components for the event that same is under- or overestimated. Separation of the stationary and non-stationary components will be illustrated with reference to FIG. 8 for a frequency of 1 kHz.

The functionality described by equations (5) and (6) is performed, in the embodiments described in FIGS. 2 to 6, by the gain filter 330 of the extraction means 250.

The stationary noise estimation can be performed by updating the estimated noise short-time power spectrum $|\hat{X}_w[k, m]|^2$ over time. At each data block (frame) k, the noise power spectrum is updated in that single-pole averaging is performed with two time constants for deciding whether speech or noise is present. A small attack time constant reflects that the current data block comprises noise. A large release time constant reflects that the current data block comprises speech.

In practice, this is implemented in accordance with $$|\hat{X}_w[k,m]|^2 = \begin{cases} \mu_1 |X[k,m]|^2 + (1-\mu_1)|\hat{X}_w[k-1,m]|^2 \\ \quad \text{if } |X[k,m]|^2 > |\hat{X}_w[k-1,m]|^2 \\ \mu_2 |X[k,m]|^2 + (1-\mu_2)|\hat{X}_w[k-1,m]|^2 \\ \quad \text{otherwise,} \end{cases} \quad (7)$$

where $\mu_1$ is the attack time constant, and $\mu_2$ is the release time constant. More specifically, the parameters $\mu_1$ and $\mu_2$ which come up in equation (7) are dimensionless parameters for which $\mu_1 < \mu_2$ applies. Taking into account the sampling frequency, however, these parameters may be interpreted and referred to as the above-indicated time constants, for example. As the proportionality relation (16) below will also show, the actual time constants and the parameters are each inversely proportional to one another. The attack time constant $\mu_1$ may comprise a value of 10000 ms=10 s, for example, whereas the release time constant may correspond to a value of 10 ms while taking into account the sampling rate.

In the preferred embodiments of the present invention which are described in FIGS. 2 to 6, the functionality of equation (7) is implemented by the averaging means 320 of the extraction means 250.

With regard to an echo power estimation, an estimate of the echo spectrum of the echo signal may be achieved by applying an echo estimation filter G[k,m] to a temporally delayed version of the loudspeaker power spectrum in accordance with $$|\hat{Y}[k,m]|^2 = G[k,m]^2 |X[k-d,m]|^2, \quad (8)$$

where $|\hat{Y}[k, m]|^2$ denotes an estimate of the power spectrum of the echo within the microphone signal. When using equation (3) it follows that the echo resulting from the non-stationary loudspeaker signal component is given by $$|\hat{Y}_s[k,m]|^2 = G[k, m]^2 |X_s[k-d,m]|^2, \quad (9)$$

and the echo given by the stationary loudspeaker signal component is $$|\hat{Y}_w[k,m]|^2 = G[k,m]^2 |\hat{X}_w[k-d,m]|^2. \quad (10)$$

Depending on the specific implementation of a preferred embodiment of the present invention as is depicted, for example, in connection with FIGS. 2 to 5, the functionality described by equation (8) may be implemented by the first echo estimation filter 240, for example. Accordingly, the functionalities described by equations (9) and (10) may be implemented by the second echo estimation filter 260 by the two filter stages 360-1, 360-2.

As was already mentioned above, the delay functionality with regard to the signals having the delay value d and occurring in equations (8) to (10) may also be implemented by said echo estimation filters 240, 260. Alternatively, said delay functionality may naturally also be realized by the time/frequency converter means 230, if no independent delay means is implemented.

With regard to the echo removal filters, the associated echo removal filters $H_s[k,m]$ and $H_w[k,m]$ are computed and applied to the microphone signal in order to suppress the echo signal starting from the non-stationary and stationary echo estimates $|\hat{Y}_s[k, m]|^2$ and $|\hat{Y}_w[k, m]|^2$. In the case of a preferred embodiment comprising a computing means 270 as is shown, for example, in FIG. 5*a*, this is effected in accordance with $$E[k,m]=H_s[k,m]H_w[k,m]Y[k,m]. \quad (11)$$

In this case, a multiplication of the respective filter coefficients of the echo removal filters $H_s[k, m]$ and $H_w[k, m]$ is performed in the combination means 380, which corresponds to a series connection of the respective echo removal filters. Multiplication of the respective filter coefficients in the frequency-based domain corresponds to a convolution of the respective impulse responses in the time domain.

By realizing the echo removal filters in a factorized manner as is also depicted in equation (11), it is possible to introduce different gain factors as parameters for the different echo components. The filter components of the non-stationary echo removal filter may be computed, for example, in accordance with $$H_s[k, m] = \left[\frac{\max\left(|Y[k, m]|^{\gamma_s} - \beta_s|\hat{Y}_s[k, m]|^{\gamma_s}, 10^{\frac{\gamma_s L_s}{20}}\right)}{|Y[k, m]|^{\gamma_s}}\right]^{\frac{1}{\gamma_s}}, \quad (12)$$

and those of the stationary echo removal filter may be computed in accordance with $$H_w[k, m] = \left[\frac{\max\left(|Y[k, m]|^{\gamma_w} - \beta_w|\hat{Y}_w[k, m]|^{\gamma_w}, 10^{\frac{\gamma_w L_w}{20}}\right)}{|Y[k, m]|^{\gamma_w}}\right]^{\frac{1}{\gamma_w}}. \quad (13)$$

The design parameters $\beta_s$, $\gamma_s$, $\beta_w$ and $\gamma_w$ may be used to control the intended performance for each of the echo removal filters. Depending on the specific implementation of preferred embodiments of the present invention, said design parameters may be selected to be fixed, designed to be adaptable, programmable or modifiable in any other manner. A typical choice of the exponential parameters is $\gamma_s=\gamma_w=2$, for example.

The so-called overestimation factors $\beta_s$ and $\beta_w$ are used for controlling the aggressiveness of the echo attenuation. For example, the aggressiveness of the corresponding echo removal filter may be increased by increasing the overestimation factor. Therefore, a typical choice of the stationary echo removal filter $H_w[k,m]$ with regard to the parameter $\beta_w=2$, in order to apply only moderate echo attenuation.

On the other hand, the echo removal filter responsible for the suppression of non-stationary echo components is to be designed in a highly aggressive manner in order to effectively attenuate disturbing speech components in the echo signal. The overestimation factor $\beta_s$ is therefore frequently designed to be larger than $\beta_w$, so that typically, $\beta_s > \beta_w$. Provided that $\beta_w=2$ is selected, $\beta_s$ may comprise values in the range of $20 > \beta_s > 2 = \beta_w$, for example (e.g. $\beta_s=4$). Generally, $\beta_w$ and $\beta_s$ belong to the same order of magnitude.

The limit values $L_s$ and $L_w$ determine the maximum echo attenuation allowed in decibel (dB). A typical value of the stationary echo removal filter is $L_w=-10$ dB or $-15$ dB, which expediently limits the attenuation for stationary echoes so as to reduce accidental artifacts. In the case of non-stationary speech at the far end, the attenuation should ensure complete attenuation of the corresponding echo components, which corresponds to a limit value for $L_s$ of about $-60$ dB for non-stationary component signals.

The functionality as is designated by equations (12) and (13) may be implemented and realized, in the preferred embodiments described in FIGS. 2 to 6, in the context of the filter computing means 370.

In some preferred embodiments of the present invention, the actual echo suppression is not performed directly by applying the echo removal filters, as is described in equations (12) and (13). Rather, the corresponding echo removal is performed on the basis of a corresponding time-smoothed version. As in the case of the above-described design parameters, the time smoothing parameters are typically manually tuned and optimized separately for the non-stationary and stationary echo suppression, respectively. Thereby, the perceivable audio quality can be further improved, as the requirements for the suppression of stationary noise components differ from those for non-stationary speech components.

Such a functionality may be performed, for example, within the context of the filter computing means 370 themselves or in any means downstream from them, for example in the combination means 380, the selecting means 390 or the distribution point 410. It is also possible to perform such a time smoothing directly within the context of the adaptive filter 210, if need be.

With regard to the above-mentioned improvement in quality it is known, for example, that increased smoothing is to be applied in cases where stationary signal components are suppressed, so as to avoid so-called tonal disturbances, as is described in Reference [8]. On the other hand, it also should be ensured that the attenuation applied of the non-stationary echo removal filters favors small values so as to cause a sufficiently high attenuation of the echo, said attenuation being due to the reverberation of the echo path. However, this should not degrade the trackability of the adaptive filter 210 in cases of fast-changing echo levels. This discussion, which tends to be a qualitative one, clearly shows the necessity of individual adjustment and optimization of the echo removal filters indicated by equations (12) and (13).

Figure 7:
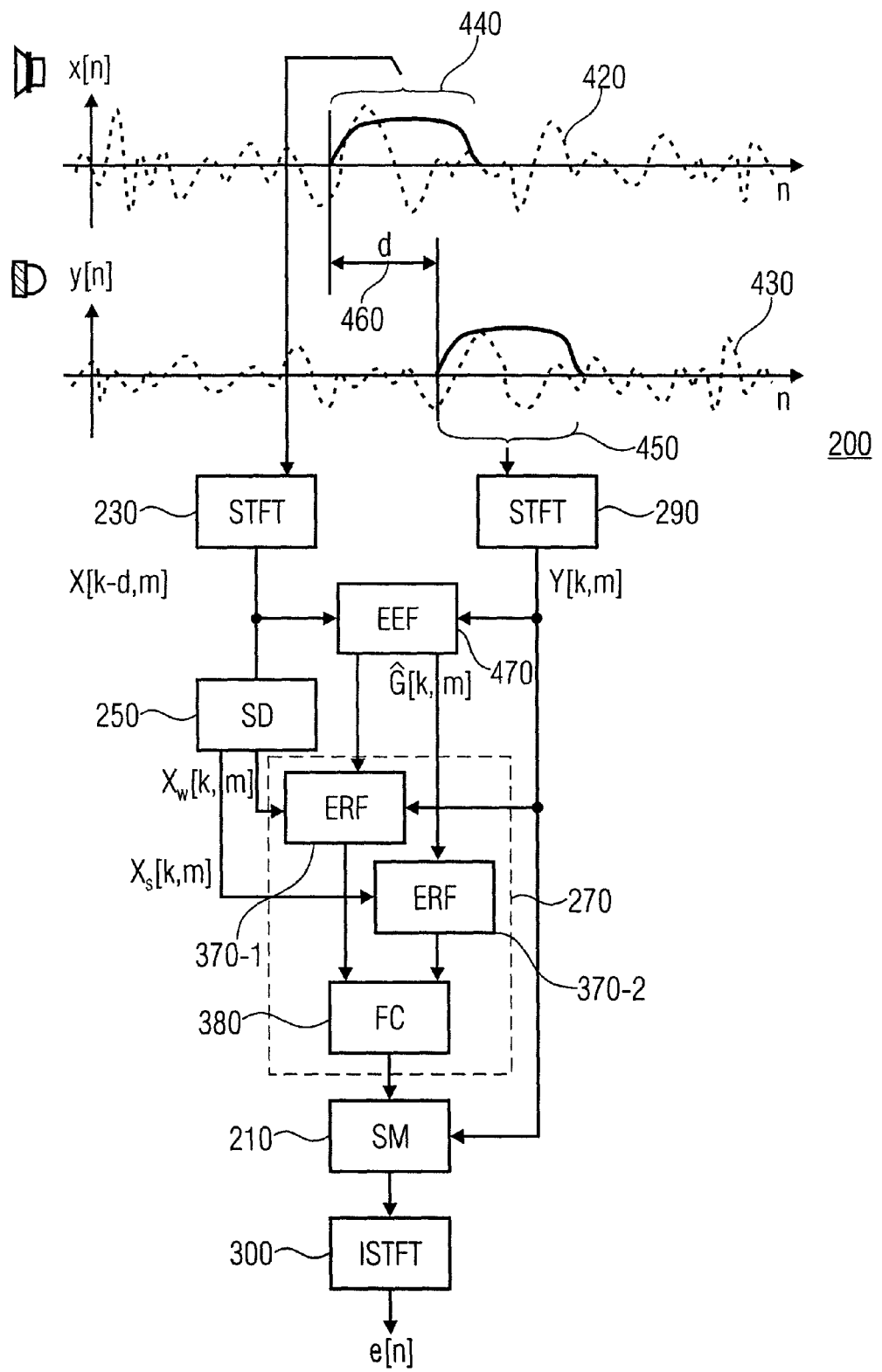
FIG. 7 shows a block diagram of a further preferred embodiment of the present invention in the form of an apparatus for computing filter coefficients.

FIG. 7 shows a further preferred embodiment of the present invention in the form of a larger, more complete block diagram or flow chart of an acoustic echo attenuation algorithm proposed and described in the context of the present description. FIG. 7 shows a preferred embodiment of the present invention as is quite similar to the preferred embodiment described in FIG. 2. Here, too, the apparatus 200 comprises a time/frequency converter means 230 in the form of a short-time Fourier transformation unit (STFT) which has the loudspeaker signal x[n] provided to it. By way of example, the upper part of FIG. 7 shows a curve 420 of the loudspeaker signal x[n] as a function of time, plotted over the time index n.

In addition to converting the signal x[n] from the time domain to the frequency domain, the time/frequency converter means 230 also performs the above-mentioned delay by the delay value d. Therefore, the spectrum X[k−d,m], which generally is a complex-valued spectrum, is available at the output of the time/frequency converter means 230. Said spectrum X[k−d,m] is provided to the extraction means 250, which in turn is designated by the letters SD (stationary discrimination) in FIG. 7. As was already explained in connection with the preferred embodiment described in FIGS. 2 to 5, the extraction means 250 also provides, in the preferred embodiment shown in FIG. 7, a stationary component signal in the frequency domain $X_w[k,m,]$, and a non-stationary component signal in the frequency domain $X_s[k,m]$. Said component signals are made available to the computing means 270.

In addition, the preferred embodiment, shown in FIG. 7, of an apparatus 200 comprises a time/frequency converter means 290, which is also implemented in the form of a short-time Fourier transformation unit (SIFT). Said time/frequency converter means 290 has a microphone signal y[n] provided to it as an input signal, as is depicted, by way of example, by a curve 430 in the top part of FIG. 7. The time/frequency converter means 290, too, generates a corresponding representation of the microphone signal Y[k,m] in the frequency domain, the index k again denoting the data block, and the index m denoting the frequency band or the frequency value or the spectral coefficient. This spectrum Y[k,m], too, is generally a complex-valued spectrum.

However, unlike the time/frequency converter means 230, the time/frequency converter means 290 comprises no additional delay functionality. Generally, this is not needed as the propagation speed of sound waves (speed of sound), which leads to the delay in the signal y[n] picked up by the microphone as compared to the associated loudspeaker signal x[n], is clearly lower in comparison with the propagation speed of electrical signals in circuits and other components.

To illustrate this, a first bracket 440 is shown with respect to the loudspeaker signal x[n] as regards the two curves 420, 430 in the top part of FIG. 7. With regard to the microphone signal y[n], a second bracket 450 is shown in FIG. 7 which designates the range of the microphone signal y[n] which corresponds to that portion of the loudspeaker signal x[n] which is designated by the bracket 440. The loudspeaker signal x[n] and the microphone signal y[n] are therefore mutually shifted by a delay value d, as is also indicated by an arrow 460 in FIG. 7.

In the preferred embodiment shown in FIG. 7, the spectra of the loudspeaker signal and of the microphone signal are provided to an echo estimation filter means 470, which estimates the echo estimation filter or its components $\hat{G}[k, m]$ on the basis of the incoming signals. These filter coefficients are also transmitted to the computing means 270.

The computing means 270, in turn, comprises two filter computing means 370-1, 370-2 for the stationary component signal and the non-stationary component signal, both filter computing means 370-1, 370-2 further having the spectrum of the microphone signal as well as the filter coefficients for the echo estimation filter $\hat{G}[k, m]$ provided to them in the preferred embodiment shown in FIG. 7. Both filter computing means 370 therefore implement not only the actual filter computing functionality, as was explained in connection with the preferred embodiment of FIGS. 2 to 5, but they also implement the functionality, contained therein, of the second echo estimation filter 260.

As was also shown in connection with FIG. 5a, both filter computing means 370, which are also referred to as ERF (echo removal filter) in FIG. 7, are coupled to a combination means 380, which is referred to as FC (filter combination) in FIG. 7. Said combination means 380 combines the filter coefficients obtained from both filter computing means in order to generate the filter coefficients for the adaptive filter 210.

Accordingly, as was already illustrated by the preferred embodiments discussed in connection with FIGS. 2 and 5, the combination means 380 is coupled to the adaptive filter 210, which in FIG. 7 is referred to as SM (spectral modification). Said adaptive filter 210 performs the associated spectral modification on the basis of the spectral representation Y[k, m], also made available to it, of the microphone signal y[n] in order to attenuate or to suppress the echo contained within the microphone signal.

Finally, the adaptive filter 210 is coupled to a frequency/time converter means 300, which is an inverse short-time Fourier transformation unit (ISTFT). The latter outputs, in the time domain, the signal e[n] cancelled by the echo.

Preferred embodiments of the present invention in the form of corresponding methods or apparatuses 200 as is shown, for example, in FIG. 7 enable a reduction in the number of artifacts introduced due to spectral modification by the adaptive filter 210. In other words, preferred embodiments of the present invention thus enable power control with respect thereto. When only far-end speech is present, the echo suppression process should be sufficiently aggressive not to allow any signal to pass through, so that it may possibly not be desired, in such a situation, to separate the non-stationary and the stationary signals and component signals. For this reason, it may possibly be advisable in such a situation to accordingly adapt the control parameter $\beta_x$, which controls or at least influences the very magnitude of the stationary component signal which is subtracted from the loudspeaker signal, in equation (6) by detecting this situation which has just been described.

In order to differentiate between the situations when only far-end speech is output by the loudspeaker signal, two different parameters are computed. This includes, initially, the so-called prediction gain, which corresponds to full-band averaging of coherence functions between the loudspeaker channel and the microphone channel. As a second parameter, use is made of the voice activity within the loudspeaker channel, which, for example, may be derived from a comparison of the temporal signal levels of the loudspeaker signal or from codec-specific parameters as are used, for example, specifically with codecs suitable for voice transmission. These codecs include, for example, LPC-based codecs or CELP-based codecs (CELP=code excited linear prediction, or code book excited linear prediction), the term codec being an artificial word created by combining the abbreviations of the English terms coder and decoder.

The prediction gain or echo prediction gain ω[k] describes the level of similarity between the microphone signal and the delayed loudspeaker signal. Computation of the prediction gain ω[k] is performed on the basis of a squared coherence function between the delayed power spectrum of the loudspeaker signal $|X_d[k, m]|^2$ and the power spectrum of the microphone signal $|Y[k, m]|^2$ in accordance with $$\Gamma_d[k, m] = \frac{(E\{|X_d[k, m]|^2 |Y[k, m]|^2\})^2}{E\{|X_d[k, m]|^2 |X_d[k, m]|^2\} E\{|Y[k, m]|^2 |Y[k, m]|^2\}}, \quad (14)$$

where E{ ... } designates the mathematical expectation value. Said mathematical expectation value may be obtained within the context of a short-time estimation of the coherence function $\Gamma_d[k,m]$ by computing or approximating the expectation value $E\{|X_d[k,m]|^2 |Y[k, m]|^2\}$ in accordance with $$E\{|X_d[k,m]|^2 |Y[k,m]|^2\} = \alpha |X_d[k,m]|^2 |Y[k,m]|^2 + (1-\alpha)$$
$$E\{|X_d[k-1,m]|^2 |Y[k-1,m]|^2\} \quad (15)$$

The factor α determines the degree of smoothing of the estimation over time. This factor has a time constant connected to it, since equation (15) roughly corresponds to an exponential decay. The time constant $T_\alpha$ of the exponential decay in seconds is approximately $$T_\alpha \infty \frac{1}{\alpha f_s}, \qquad (16)$$

where $f_s$ denotes the sampling frequency. In other words, the proportionality relation (16) illustrates how factors which are actually dimensionless (here $\alpha$), relating to the sampling rate $f_s$, may be indicated as time constant (here $T_\alpha$).

The prediction gain $\omega[k]$ is then computed as the mean value of the coherence functions $\Gamma_d[k, m]$ over the frequencies which are indicated by the indices m=0, M−1, in accordance with $$\omega[k] = \frac{1}{M} \sum_{m=0}^{M-1} \Gamma_d[k, m], \qquad (17)$$

where M denotes the very number of frequency bands.

An echo gain factor close to 1 signifies that the microphone signal can be (almost) fully predicted on the basis of the delayed loudspeaker signal. Therefore, the likelihood that the microphone signal contains only far-end speech tends toward 1. The control parameter $\beta_x$ can then be controlled in relation to the prediction gain $\omega$. Whenever the prediction gain is high, only far-end speech is present, and the echo attenuation should be sufficiently aggressive to remove all (echo) signals. Thus, the noise is kept within the non-stationary path and is removed with the lowest limit value $L_s$ in decibel (dB) in that the control parameter $\beta_x = \beta_w = 0$ is chosen. Whenever the prediction gain is low, both near-end and far-end speech may be present, so that the echo suppression should be less aggressive so as not to introduce artifacts. In this case, noise is processed through the stationary path, and is removed with the limit value $L_w$ in decibel (dB). Moreover, the control parameter $\beta_x = \beta_w$ is used in this case.

In this case it should be noted, however, that the prediction gain could be high if the loudspeaker signal contains only noise which is picked up by the microphone without the presence of speech. To prevent that the value of the control parameter $\beta_x$ is chosen to be too large in this case, which would lead to excessive suppression, a second control parameter is used, namely the voice activity within the loudspeaker channel. Therefore, the above-described rules for computing the control parameter $\beta_x$ as a function of the prediction gain $\omega$ actually apply only when speech is active within the loudspeaker channel.

In the preferred embodiment depicted in FIG. 7, this functionality, which is described by equations (14) to (17), is performed by the computing means 270, more specifically by the two filter computing means 370 and the combination means 380. A corresponding implementation is naturally also possible within the context of the preferred embodiments described in FIGS. 2 to 5 in that the computing means 270 possibly not only has the microphone signal, which is optionally drawn in in FIG. 2, provided to it via the input 280, but also has the possibly unmodified loudspeaker signal provided to it via the input 220.

Figure 8:
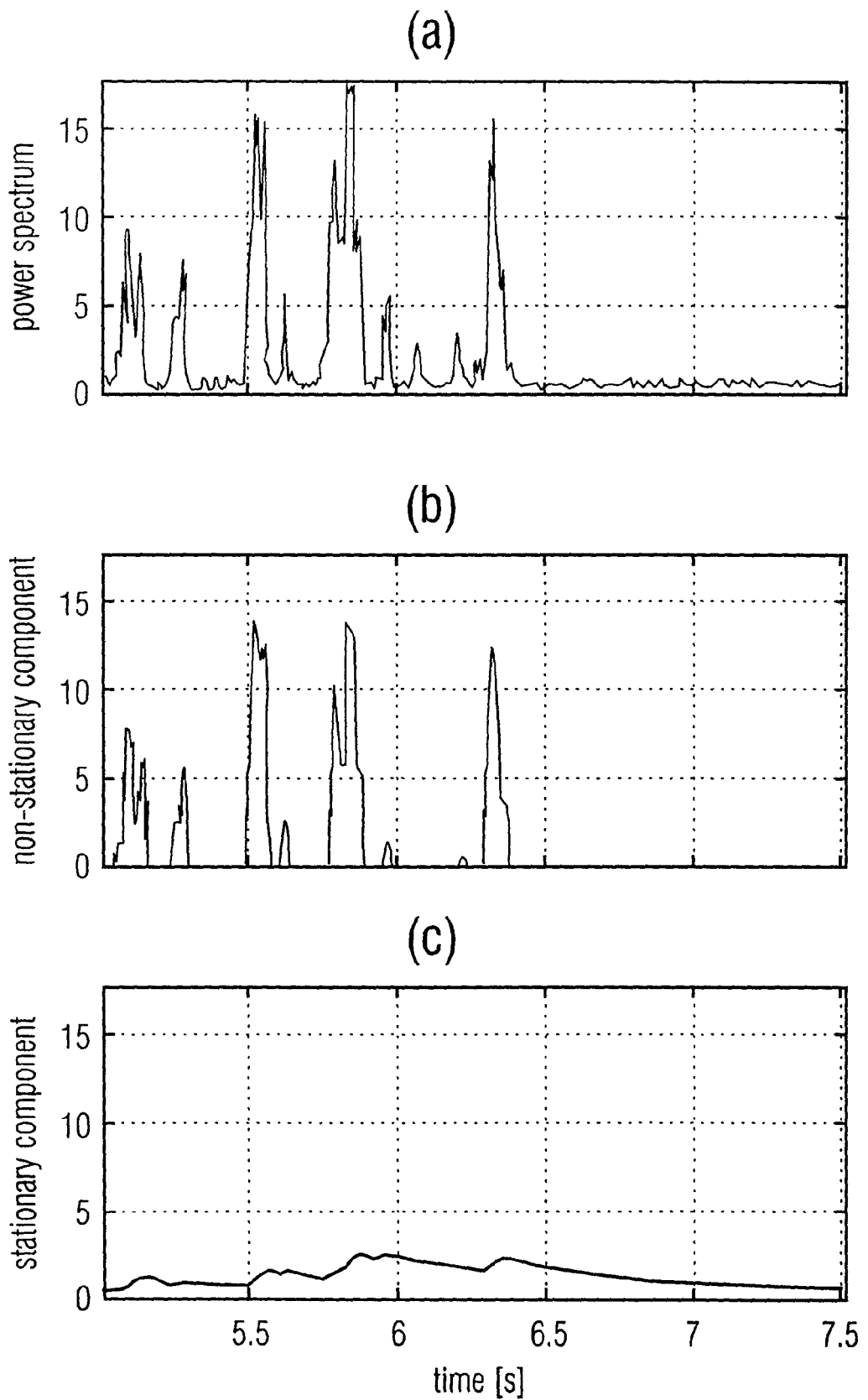
FIGS. 8a to 8c illustrate a separation of a stationary component and a non-stationary component of a loudspeaker signal.

To illustrate the mode of operation of the preferred embodiments of the present invention in more detail, signal processing will be described below in connection with FIGS. 8 to 10. FIG. 8 shows the separation or extraction of the stationary component and the non-stationary component of the loudspeaker signal. In the partial illustration a, FIG. 8 shows the loudspeaker power spectrum at a frequency of 1 kHz, which is plotted as a function of time in a range from about 5 s to about 7.5 s. The abscissa of the partial illustration c here applies to all three partial illustrations a to c. Partial illustration b shows the corresponding power spectrum of the non-stationary component, whereas partial illustration c reflects the corresponding power spectrum of the stationary component.

The non-stationary component, or the associated non-stationary component signal, depicted in partial illustration 8b comprises high values in each case when the associated power spectrum in the partial illustration 8a, too, comprises correspondingly high contributions. In the areas between these ranges, however, the non-stationary component disappears almost completely.

By contrast, the stationary component, which was determined by the floating, recursive averaging in accordance with equation (7), exhibits values which, as compared to the non-stationary component of FIG. 8b, are clearly smaller in magnitude and which, however, exhibit a clearly smoother curve on account of the floating averaging. In particular, the stationary component in FIG. 8c, and/or the associated stationary component signal in the time period from about 6.4 s exhibits an exponential or exponential-like drop as was also mentioned in connection with the proportionality relation (16). This decay here is due to the fact that the power spectrum in FIG. 8a in this range comprises no more high values which are due to corresponding speech signals. The spectral contributions exceeding the stationary component drop accordingly.

Figure 9:
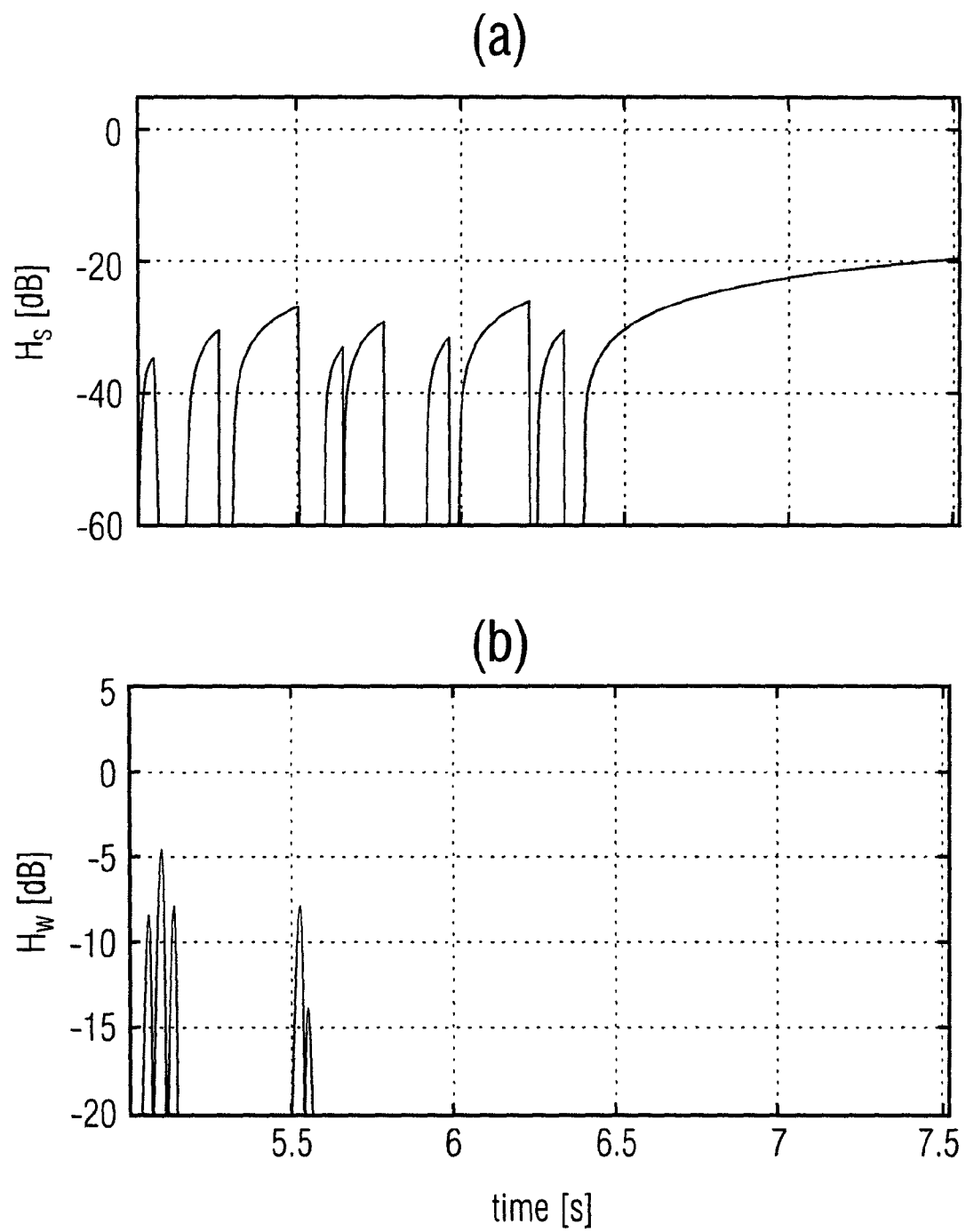
FIG. 9a shows an echo suppression filter for the non-stationary component at a frequency of 1 kHz.
FIG. 9b shows an associated echo suppression filter for a stationary component of the signal.

On the basis of the data shown in FIG. 8, FIG. 9 depicts the associated echo removal filters. More specifically, FIG. 9 shows the two associated echo removal filter curves $H_s$ and $H_w$ for the frequency of 1 kHz, which are computed on the basis of equations (12) and (13). Partial illustration 9a shows the echo removal filter $H_s$ for the non-stationary component at the frequency of 1 kHz, said filter being computed in accordance with equation (12). Partial illustration b shows the corresponding echo removal filter for the stationary component $H_w$ in accordance with equation (13).

Figure 10:
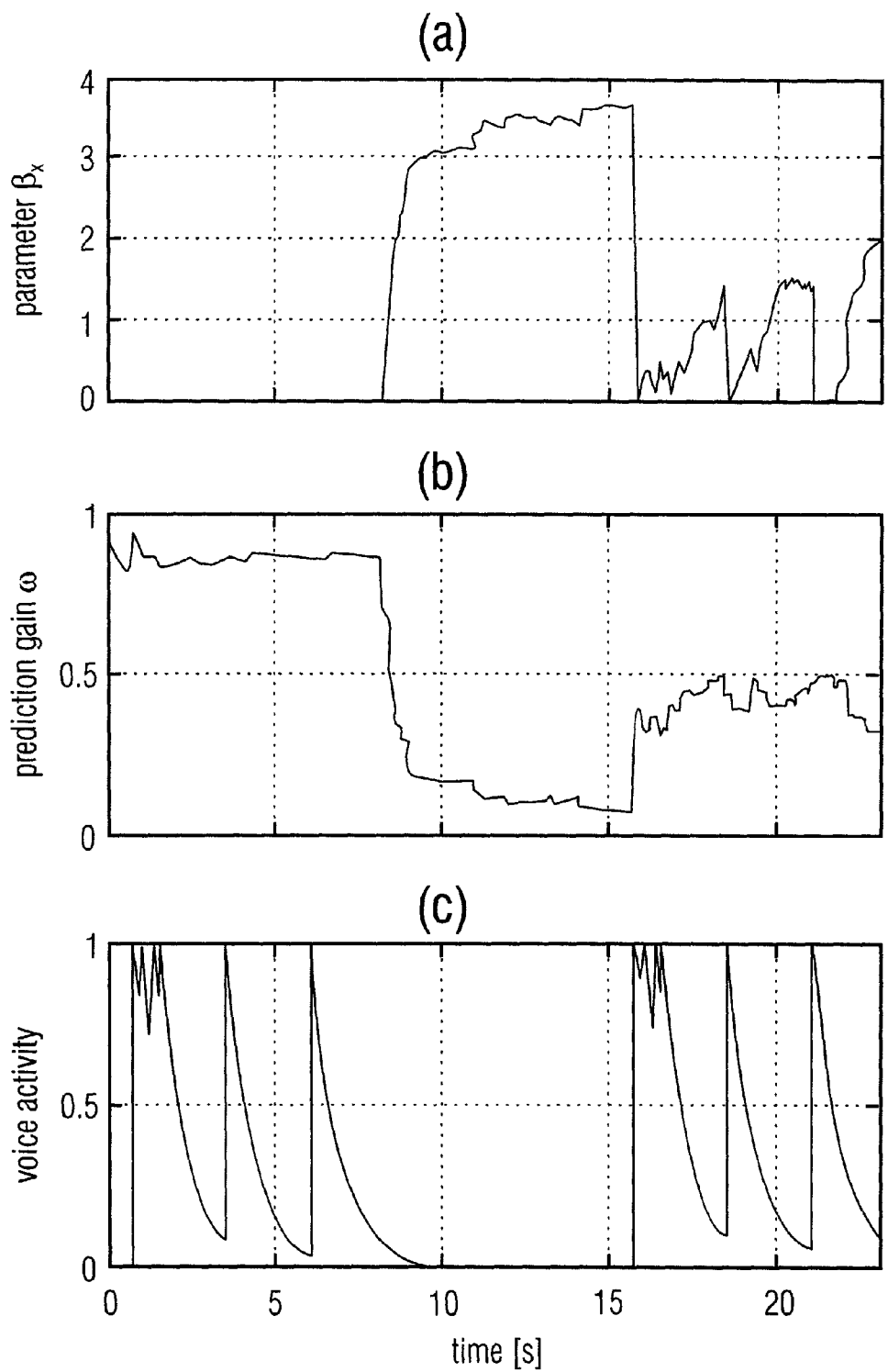
FIGS. 10a to 10c illustrate the relation between the strength of a stationary component and a non-stationary component and a prediction gain along with a voice activity of a loudspeaker channel.

FIG. 10 illustrates on the basis of the same data, which is plotted on a larger time scale, however, as is shown by the abscissa of the partial illustration 10c, which also applies to the partial illustrations a and b. FIG. 10 illustrates the relation between the strength of the control parameter $\beta_x$ and the stationary/non-stationary separation in partial illustration 10a, and of the prediction gain $\omega$ in partial illustration 10b along with the voice activity of the loudspeaker channel in partial illustration 10c.

More specifically, FIG. 10 illustrates the relationship between the control parameter $\beta_x$ and the two control parameters $\omega$ and the voice activity, as were introduced in the above description. The first third of the simulation underlying FIG. 10 corresponds to the situation where only far-end speech is present, which is characterized by a high prediction gain. In this case, the control parameter $\beta_x$ is set to the value $\beta_x = \beta_w = 0$, so as to suppress the non-stationary component in an aggressive manner, and to also suppress the stationary component, in order not to allow any signal to pass through.

The second third of the simulation corresponds to the situation where speech is present only at the far end, which is recognizable and, thus, detectable, by a low prediction gain $\omega$ and a lack of voice activity in the loudspeaker signal. Then the control parameter $\beta_x$ is selected to be large so as to allow all stationary components to pass through the stationary path and to be removed with as little aggressiveness as possible so as not to introduce any artifacts. The last third of the simulation corresponds to a double-talk situation wherein the control parameter $\beta_x$ ranges between low values whenever voice activity is present in the loudspeaker channel, and larger values when no voice activity is detected.

In the preferred embodiments of the present invention which have been described so far, as was illustrated, for example, in FIG. 6, which may also be regarded as a general flow chart of a corresponding preferred embodiment in accordance with the present invention, separate suppression of the stationary and non-stationary echo components is not achieved by separating the corresponding loudspeaker signals, but is performed by estimating the overall echo signal.

In these preferred embodiments of the present invention, an estimation of the power spectrum of the echo signal is achieved by applying an echo estimation filter $G[k,m]$ or $G[k,m]^2$ to a delayed version of the loudspeaker power spectrum in accordance with equation (8), where $|\hat{Y}[k,m]|^2$ represents an estimate of the power spectrum of the echo, which estimate is contained in the microphone signal. Separating the loudspeaker power spectrum into stationary components $|X_w[k,m]|^2$ and non-stationary components $|X_s[k,m]|^2$ in accordance with equation (3) results in that the echo originating from the non-stationary loudspeaker signal component is given by equation (10), and that the echo originating from the stationary loudspeaker signal components is given by equation (9).

Using the non-stationary and stationary echo estimates $|\hat{Y}_s[k,m]|^2$ and $|\hat{Y}_w[k,m]|^2$, the corresponding echo removal filters $H_s[k,m]$ and $H_w[k,m]$ can be computed. These echo removal filters are then combined and applied to the microphone signal so as to suppress the echo signal, which is effected in accordance with the equation $$E[k,m]=H[k,m]Y[k,m], \quad (18)$$

where $H[k,m]$ is given by $$H[k,m]=\text{combination}(H_s[k,m],H_w[k,m]). \quad (19)$$

One possibility of combining the different echo removal filters $H_s[k,m]$ and $H_w[k,m]$ is to use the product of same in accordance with equation (11), which corresponds to connecting the two filters in series.

A further possibility is to use the respective minimum of the echo removal filters in accordance with $$E[k,m]=\min(H_s[k,m],H_w[k,m])Y[k,m], \quad (20)$$

where the function min( . . . ) represents the minimum of the respective values. Put differently, in this case, the relation combination ( . . . )=min( . . . ) applies.

As was already explained above, these computations may be performed, for example, in the combination means 380, but may also be performed in the selecting means 390 or the distribution point 410. In addition, more complex combinations and computations of the individual suppression filters, which are based, for example, on linear combinations or nonlinear equations, may also be performed in the respective means. Likewise, it is possible to perform the corresponding combination not in a bandpass-signal-wise manner, but based on groups of bandpass signals, or for all bandpass signals in the same manner.

By realizing the echo removal filters in this combined manner it is possible to introduce different gains for different echo components. The non-stationary echo removal filter is computed in accordance with equation (12), whereas the stationary echo removal filter is computed in accordance with equation (13).

The actual echo suppression is frequently not performed on the basis of the direct application of the echo removal filters in accordance with equations (12) and (13), but is rather performed on the basis of corresponding time-smoothed versions. As in the case of the above-described design parameters, the time smoothing parameters, too, may be manually adjusted separately for non-stationary and stationary echo suppression. In this manner, the audio quality perceived may be further increased, since the requirements for the suppression of the stationary noise components differ from those for the non-stationary speech components.

For example, it is well known that it is advisable to use a more intense smoothing in those cases where stationary signal components are to be suppressed, so as to avoid so-called musical tones. On the other hand it is to be ensured that the smoothing which is applied to non-stationary echo removal filters favors smaller values so as to sufficiently suppress echoes which originate from long contributions of the echo path, or long tails of the echo path. However, this should not impair the succession behavior in the case of fast-changing echo levels. This qualitative discussion clearly shows the necessity of individually adapting and optimizing the two different echo removal filters in accordance with equations (12) and (13).

Figure 11:
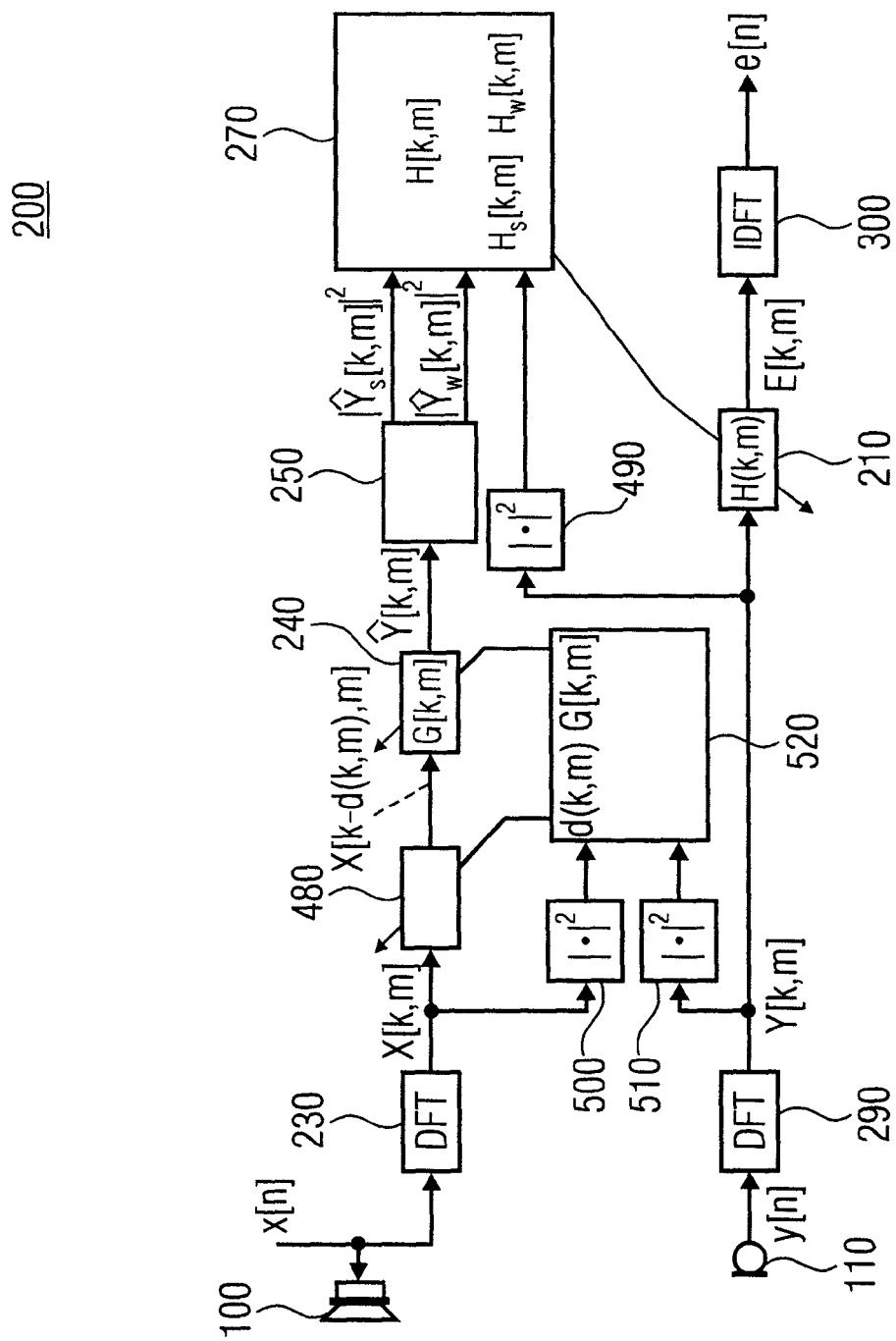
FIG. 11 shows a block diagram of a further preferred embodiment of the present invention.

In the following, a further approach in accordance with a further preferred embodiment of the present invention in the form of a method and/or an apparatus will be described wherein separate echo removal filters are applied to the stationary signal components and the non-stationary signal components. FIG. 11 shows the corresponding block diagram of an apparatus 200 comprising a corresponding adaptive filter 210. Due to the large number of structural similarities, reference shall be made below in particular to the description of the preferred embodiments shown in FIGS. 2 to 5 and 6 and 7.

The apparatus 200 in accordance with a preferred embodiment of the present invention again includes a loudspeaker 100 or a terminal for a loudspeaker 100 or an input for a corresponding loudspeaker signal $x[n]$. Said loudspeaker signal $x[n]$ is transformed to a spectral representation $X[k,m]$ of the loudspeaker signal within the context of a time/frequency converter means 230 referred to as DFT (discrete Fourier transform). Said loudspeaker signal is provided to a delay means 480, which generates a delayed version of same $X[k-d(k,m),m]$, $d(k,m)$ being the corresponding delay value.

The signal delayed by the delay means 480 is then provided to a first echo estimation filter 240, which generates an echo estimation signal $\hat{Y}[k,m]$ on the basis of filter coefficients $G[k,m]$. Said echo estimation signal $\hat{Y}[k,m]$ is provided to an extraction means 250, which generates, on the basis of the spectral coefficients of this estimated echo signal, non-stationary and stationary power spectra of this signal as (derived) component signals of the loudspeaker signal. Thus, the extraction means 250 outputs the signals $|\hat{Y}_s[k,m]|^2$ and $|\hat{Y}_w[k,m]|^2$ to a computing means 270.

The microphone signal $y[n]$ of a microphone 110 is also provided to a time/frequency converter means 290 configured as a DFT, which generates a spectral representation $Y[k,m]$ of the time signal $y[n]$ from same. This signal is supplied via an energy value computing means 490, which, on the basis of the spectral components of the microphone signal, determines a power spectrum of said spectral components by squaring the (absolute) magnitude of the individual values. The power spectrum thus obtained is also provided to the computing means 270, which together with the above-described power spectra computes the two echo removal filters $H_s[k,m]$ and $H_w[k,m]$ the filter coefficients of the actual adaptive filter $H[k,m]$ and forwards them to the adaptive filter 210.

The adaptive filter 210 is also coupled to the output of the time/frequency converter means 290 and thus also receives the spectral components Y[k,m] of the microphone signal y[n], from which it generates the echo-suppressed signal in the frequency domain or frequency-related domain E[k,m], while taking into account the filter coefficients H[k,m]. This echo-suppressed signal is then provided to the frequency/time converter means 300 configured as an IDFT (inverse DFT), which eventually converts this signal back to the time domain.

For determining the delay value d(k,m) for the delay means 480, and for determining the echo estimation filter coefficients for the echo estimation filter 240, both the spectral representations of the loudspeaker signal X[k,m] and the spectral representations of the microphone signal Y[k,m] are transmitted to corresponding energy computing means 500, 510 which are coupled to the outputs of the two time/frequency converter means 230, 290. The energy computing means 500 is coupled to the output of the time/frequency converter means 230, and the energy computing means 510 is coupled to the output of the frequency/time converter means 300.

Both energy value computing means 500, 510 each compute, by analogy with the energy computing means 490, power spectra by squaring the magnitudes of the respective spectral components and provide these values to a further computing means 520. The further computing means 520 then determines, on the basis of the values made available to it, an estimate for the delay d(k,m) and values for the filter coefficients G[k,m] for the echo estimation filter 240. The corresponding above-mentioned values are then transmitted to the delay means 480, on the one hand, and to the echo estimation filter 240, on the other hand, with which the further computing means 520 is also coupled.

As can also be seen from the preferred embodiment shown in FIG. 11, the separation of the respective component signals ($|\hat{Y}_s[k, m]|^2$ and $|\hat{Y}_w[k, m]|^2$) may thus be performed on the basis of an estimation of the echo signal spectrum $\hat{Y}[k,m]$, which is computed in accordance with $$\hat{Y}[k,m] = G[k,m]X[k-d,m]. \quad (21)$$

This computation is conducted in the echo estimation filter 240.

The definition of the two echo removal filters $H_s[k,m]$ and $H_w[k,m]$ in accordance with equations (12) and (13) remain unchanged. The same applies to the determination of the combined echo removal filter H[k,m].

The additional method described in FIG. 11, or the associated apparatus 200, is thus based on the assumption that the stationary and non-stationary echo components of the estimated echo signals are also uncorrelated, so that $$|\hat{Y}[k,m]|^2 \approx |\hat{Y}_s[k,m]|^2 + |\hat{Y}_w[k,m]|^2. \quad (22)$$

The estimated power spectra of the stationary echo components may then be determined by subtracting an estimate of the stationary component of the echo estimate $|\hat{Y}_w[k, m]|^2$ from the power spectrum of the estimated echo signal $|\hat{Y}[k, m]|^2$. Thus, $$|\hat{Y}_s[k,m]|^2 = |\hat{Y}[k,m]|^2 - |\hat{Y}_w[k,m]|^2. \quad (23)$$

In practice, the signal $|\hat{Y}_s[k,m]|^2$ is estimated by filtering the power spectrum of the estimated echo signal $|\hat{Y}[k, m]|^2$ in accordance with $$|\hat{Y}_s[k,m]|^2 = F_y[k,m]|\hat{Y}[k,m]|^2. \quad (24)$$

As the filter, a further gain filter $F_y[k,m]$, or its square $F_y[k,m]^2$, is employed which is determined by analogy with the gain filter $F_x[k,m]$, or $F_x[k,m]^2$, and is therefore not discussed an explained in detail at this point. This functionality is also performed by the extraction means 250 on the basis of the respective signals derived.

It should be noted at this point that the preferred embodiment shown in FIG. 11 relates to the case where the estimated spectrum of the echo signal $\hat{Y}[k,m]$ is already available. Of course, the corresponding method is also applicable when only the estimated power signal of the estimated echo signal $|\hat{Y}[k, m]|^2$ in accordance with equation (8) is known. This situation will be described in more detail in connection with the preferred embodiment shown in FIG. 12.

Figure 12:
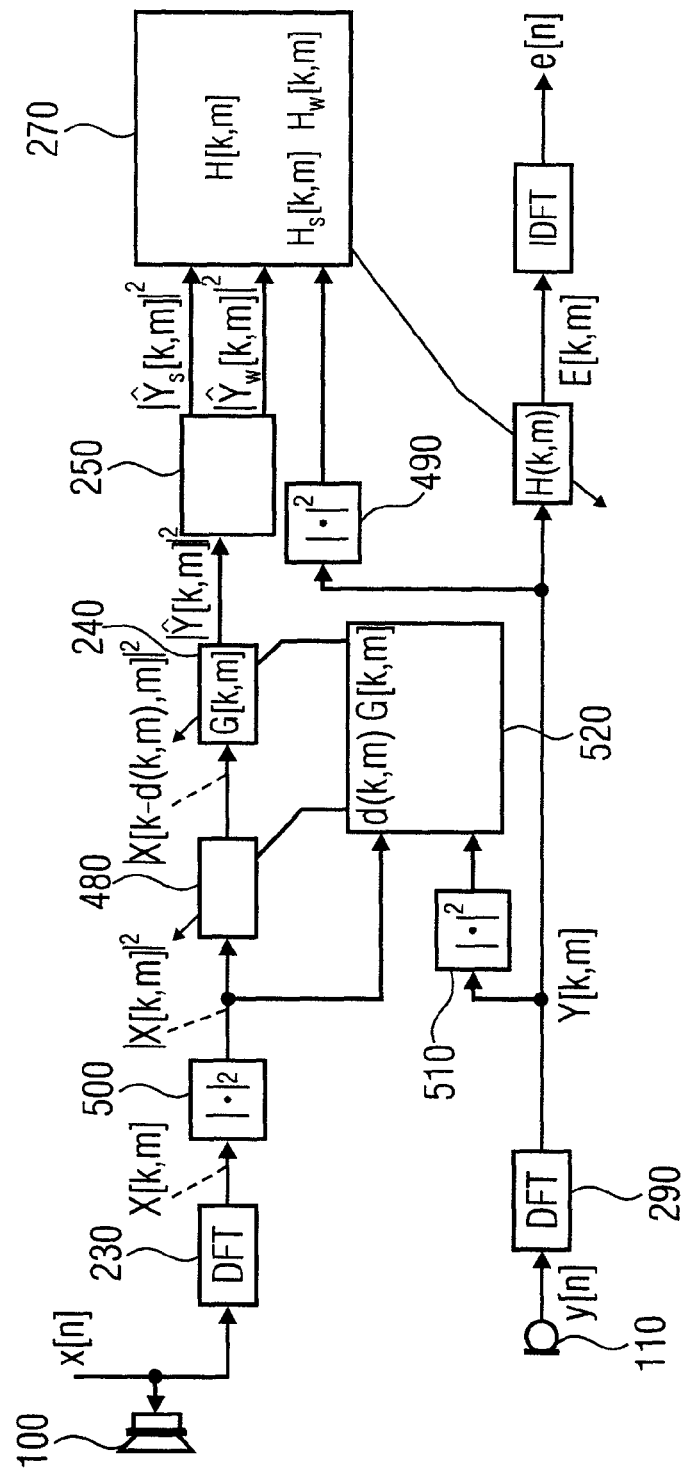
FIG. 12 shows a block diagram of a further preferred embodiment of the present invention.

While FIG. 11 shows a block diagram of an acoustic echo attenuation approach wherein separation of the stationary and non-stationary echo components is applied on the basis of an estimated echo spectrum $\hat{Y}[k,m]$, the block diagram depicted in FIG. 12 illustrates a similar approach. By contrast, however, the latter is based on an acoustic echo attenuation approach which applies separation of the stationary and non-stationary echo components on the basis of an estimated power spectrum of the echo signal $|\hat{Y}[k, m]|^2$.

Consequently, it is not only the modes of operation of the two preferred embodiments shown in FIGS. 11 and 12 that are very similar, but also their structures, as the description which follows will show.

More specifically, the preferred embodiment shown in FIG. 12 differs from that shown in FIG. 11 essentially in that the energy computing means 500 is no longer connected exclusively upstream from the further computing means 520 with regard to the loudspeaker signal x[n] transferred to the frequency domain, but is rather connected directly to the output of the time/frequency converter means 230 again configured as a DFT. In this manner, not only the further computing means 520, but also the delay means 480, the echo estimation filter 240 and the extraction means 250 are no longer provided with the actual spectral components, but rather with the power spectra of same.

Apart from this, however, the two preferred embodiments shown in FIGS. 11 and 12 differ only in that the respective computations possibly proceed marginally differently from one another within the individual components and means. For example, the corresponding computation of the energy-related values of the individual spectral components is no longer performed in the extraction means 250, since it was already performed previously by the energy value computing means 500.

Figure 13:
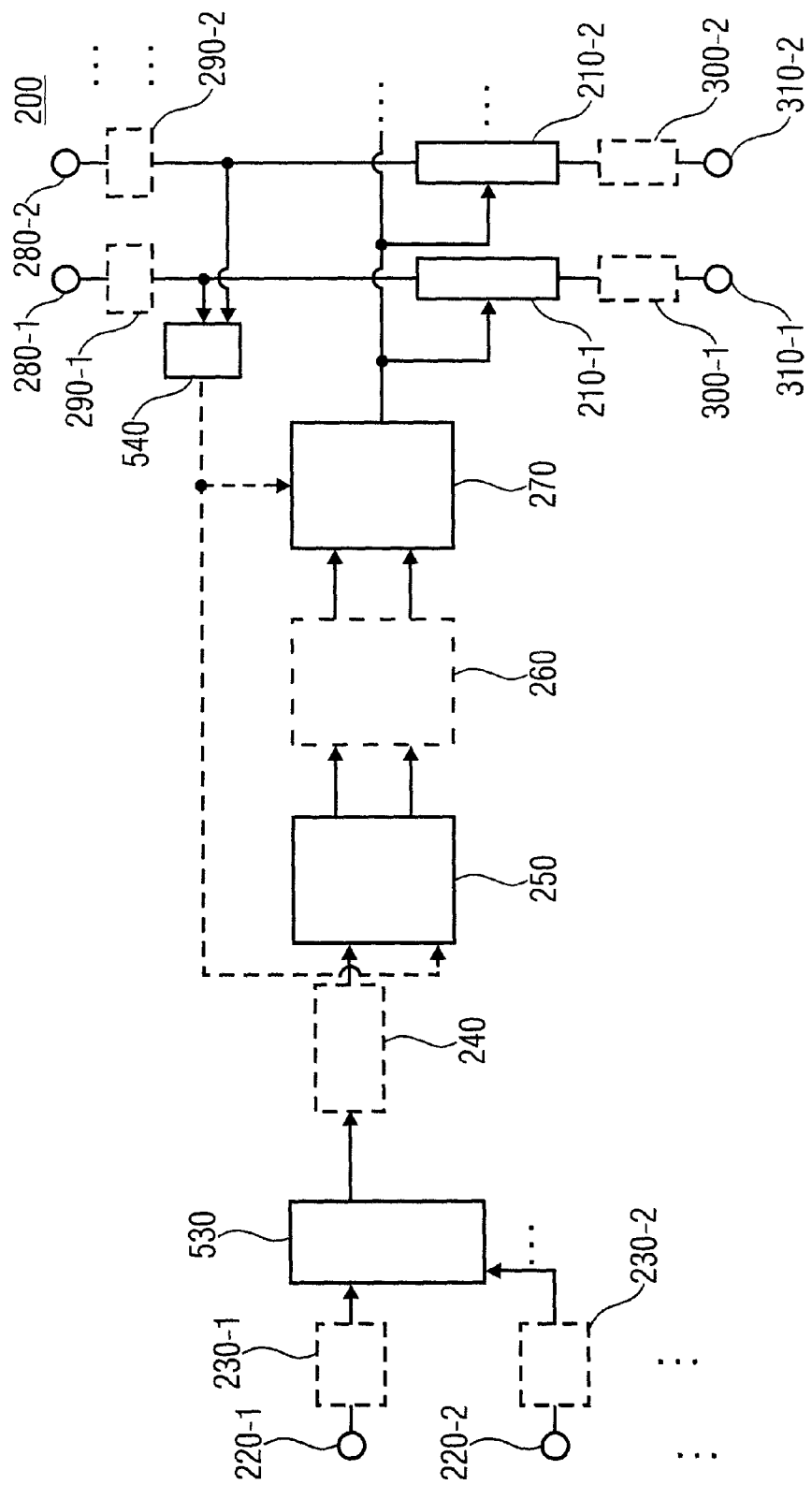
FIG. 13 shows a block diagram of a preferred embodiment of the present invention for a multichannel implementation.

FIG. 13 shows a further preferred embodiment of the present invention, wherein, e.g., more than one loudspeaker signal or more than one microphone signal are provided to the respective apparatus 200. Put differently, the preferred embodiment depicted in FIG. 13 is a multichannel apparatus.

While preferred embodiments of the present invention were discussed and described above only for individual channels or the case of an individual channel, wherein only one loudspeaker signal and one microphone signal were available, preferred embodiments of the present invention are not limited to the case of an individual channel, as will be explained below. Said preferred embodiments may also be applied, by analogy, to multichannel-capable acoustic echo attenuation systems.

Since the preferred embodiment, shown in FIG. 13, of an apparatus 200 is very similar in structure to that shown in FIG. 2, reference shall be made below to the description in connection with FIGS. 2 to 5 as far as the mode of operation, connection and other aspects are concerned.

The multichannel variant, shown in FIG. 13, of the apparatus 200 comprises a plurality of inputs 220-1, 220-2, ... where several loudspeaker signals may be coupled into the apparatus 200. Accordingly, the apparatus 200 also comprises a corresponding plurality of optional time/frequency converter means 230-1, 230-2, ..., which possibly perform a translation or conversion of the corresponding loudspeaker signals from the time domain to a frequency-related domain, as was already set for in detail in connection with FIG. 2.

The plurality of time/frequency converter means 230 are coupled to a corresponding number of inputs of a bundling means 530, which on the basis of the incoming loudspeaker signals forms a common, derived loudspeaker signal which then forwards same to the first echo estimation filter 240 or to the extraction means 250, depending on whether the optional first echo estimation filter 240 is present. As was already described in connection with the preferred embodiment shown in FIG. 2, the extraction means 250 is possibly coupled to an optional second echo estimation filter 260 or directly to the computing means 270. Said means finally outputs the computed filter coefficients at an output of same.

Unlike the preferred embodiment shown in FIG. 2, the multichannel variant of the apparatus 200 in FIG. 13 further comprises a further bundling means 540, which is coupled, on the input side, to a corresponding number of inputs 280-1, 280-2, ... for corresponding microphone signals via optional time/frequency converter means 290-1, 290-2, ..... The further bundling means 540 determines, by analogy with the bundling means 530, on the basis of the microphone signals which are present within the time domain or in a frequency-related domain and are made available to it, a derived, effective or common microphone signal, which may optionally be made available to the extraction means 250 or to the computing means 270.

The multichannel variant of the apparatus 200 as is shown in FIG. 13 further comprises an adaptive filter 210-1, 210-2, ... for each microphone signal or each of the microphone signal inputs 280, said adaptive filter 210-1, 210-2, ... being coupled, possibly via the optional time/frequency converter means 290-1, 290-2, ..., to the respective inputs 280-1, 280-2, .... Accordingly, the adaptive filters 210-1, 210-2, ... are coupled, possibly via a plurality of optional frequency/time converter means 300-1, 300-2, ..., to an output 310-1, 310-2, ..., respectively. The output signals which are filtered by the adaptive filters 210, are cleared of echoes or are spectrally modified, are then available to the apparatus 200 at said outputs 310.

The adaptive filters 210-1, 210-2, ... are all coupled in parallel to the output of the computing means 270 at which output said computing means 270 provides the filter coefficients for the adaptive filters. In other words, all microphone signals of the plurality of microphone signals are filtered, in an preferred embodiment of the present invention as is depicted in FIG. 13, with the same adaptive filter from a functional point of view, i.e. on the basis of the same filter coefficients, so as to obtain the spectrally modified, or echo-cancelled, versions of the corresponding microphone signals.

Thus, if $x_l[n]$ is the signals of the $l^{th}$ loudspeaker, where l is an integer ranging from 0 to L−1, and where L designates the number of the different loudspeakers or loudspeaker signals, the same model may be introduced, by analogy with equation (1), in accordance with $$x_l[n]=x_{s,l}[n]+x_{w,l}[n] \quad (25)$$

where $x_{s,l}[n]$ modulates the contribution of the non-stationary speech, and $x_{w,l}[n]$ modulates the contribution of the stationary noise, which are contained in the $l^{th}$ loudspeaker signal. In accordance with equation (2) the SIFT domain representation of equation (25) is given by $$X_l[k,m]=X_{s,l}[k,m]+X_{w,l}[k,m]. \quad (26)$$

A common, bundled power spectrum for all of the loudspeaker channels is then computed by combining the spectra of the individual loudspeaker signals in the bundling means 530 shown in FIG. 13 in accordance with $$|X[k,m]|^2 = \sum_{l=0}^{L-1} |X_l[k,m]|^2, \quad (27)$$

where L represents the number of the loudspeaker channels. The separation of the non-stationary and stationary signal components in accordance with equations (5) and (7) is then performed with regard to the common or bundled power spectrum in accordance with equation (27).

By analogy therewith, a common or bundled power spectrum for the microphone channels is also computed in accordance with $$|Y[k,m]|^2 = \sum_{p=0}^{P-1} |Y_p[k,m]|^2, \quad (28)$$

where $Y_p[k,m]$ designates the signal of the $p^{th}$ microphone 110, and P represents the number of microphones. The index p again is an integer ranging from 0 to P−1. This computation is possibly performed, in the preferred embodiment shown in FIG. 13, by the further bundling means 540.

For determining the two echo removal filters in accordance with equations (12) and (13), the loudspeaker (power) spectra $|X[k,m]|^2$ in accordance with equation (27) and the microphone (power) spectrum $|Y[k,m]|^2$ in accordance with equation (28) are used during the further algorithmic steps, as were explained in the preceding paragraphs of the description. The determination of the control parameter $\beta_x$ described in connection with the performance control in accordance with equations (14) to (17) may also be performed on the basis of the common or bundled spectra in accordance with equations (27) and (28).

The actual echo suppression within the context of the spectral modification is then performed individually for each microphone signal, but using the same echo removal filter 210 for each microphone channel in accordance with $$E_p[k,m]=H_s[k,m]H_w[k,m]Y_p[k,m] \quad (29)$$

for p=0, 1, ..., P−1. By analogy therewith, the echo removal filters 210 may also be implemented differently, for example by analogy with equation (19), as was explained above.

In this context it is worth noting that within the context of the multichannel variant of the apparatus 200, as is shown, for example, in FIG. 13, the number L of the loudspeaker signals and the number P of the microphone signals should both be identical and different from each other. Any number of inputs may be provided, in principle, both for the loudspeaker signals and for the microphone signals. Also, it is not absolutely needed to provide both a plurality of loudspeaker signal inputs and a plurality of microphone signal inputs with the corresponding bundling means 530, 540. In preferred embodiments of the present invention, it is quite possible that only a plurality of loudspeaker signal inputs are implemented with a corresponding bundling means 530 without having to implement more than one microphone signal input with a corresponding further bundling means 540. Such a system may be employed, for example, when there is one single microphone but a plurality of loudspeakers, for example because the communication signal of the far-end subscriber is reproduced via a sound system comprising several loudspeakers, as may be implemented in motor cars, for example.

In addition, it is not necessary to possibly implement more than one input for a loudspeaker signal with a corresponding bundling means 530, when only one central loudspeaker, for example within the context of a conference system, is implemented, but a plurality of speakers each have a microphone of their own available to them. In such a case, only the implementation of the further bundling means 540 may possibly be advisable.

In addition, it is worth noting at this point that the bundling means 530, 540 may naturally be configured such that they are designed for more loudspeaker signals or microphone signals than are eventually provided to them. Accordingly, an apparatus 200 may possibly comprise more corresponding inputs 220, 280 than will eventually be used. In this case, for example, an upstream circuit, such as the optional time/frequency converter means 230, 290, or the bundling means 530, 540 themselves, may determine the number of active channels and select the parameters L and P accordingly. Of course, an external supply of the number of channels and possibly of the number of microphone and loudspeaker signals to be taken into account may also be implemented.

It should also be noted at this point that the preferred embodiment shown in FIG. 13 naturally also works with only one single loudspeaker signal and one single microphone signal, if the corresponding parameters L and P are transmitted to the bundling means 530, 540. In principle, equations (27) and (28) are also applicable to the cases P=1 and/or L=1. Thus, the preferred embodiment shown in FIG. 13 represents a "downward-compatible" extension of the preferred embodiment shown in FIG. 2.

As regards the frequency resolution, it may possibly be advisable to deviate from that of an STFT. The uniform spectral resolution of an STFT is not very well adapted to human perception. It may therefore possibly be advantageous to group the uniformly spaced-apart coefficients $|X[k, m]|^2$ and $|Y[k, m]|^2$ in a number of non-overlapping partitions or groups, as is also shown in Reference [9], these partitions or groups comprising bandwidths which mimic the frequency resolution of the human auditory system, as is represented, for example, in Reference [10].

For a sampling rate of 16 kHz, a DFT block length for the STFT of 512 samples and 15 groups or partitions is a reasonable choice, each partition having a bandwidth which roughly corresponds to double the equivalent rectangular bandwidth (ERB), as is described in Reference [10]. The bands correspond to the partitions as are represented in FIG. 14.

Figure 14:
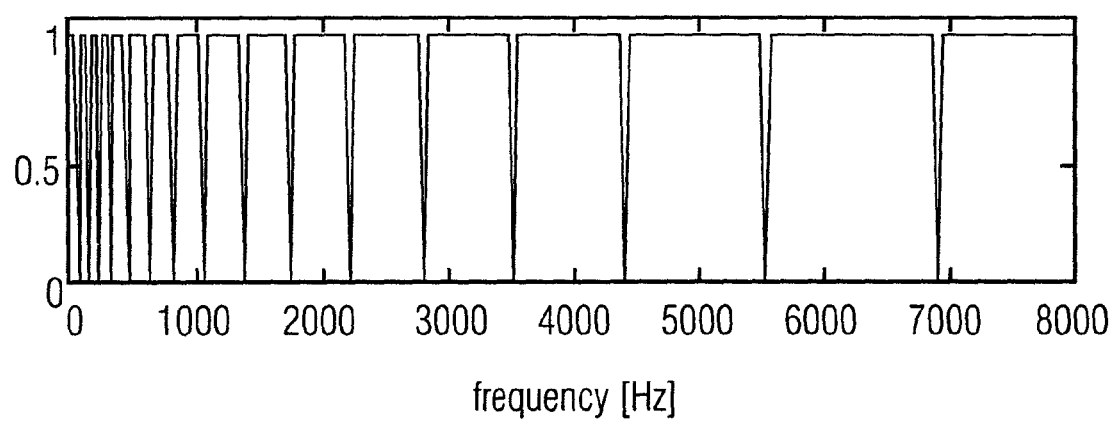
FIG. 14 shows an illustration of a grouping of a uniform short-time Fourier transformation spectrum into groups so as to mimic the non-uniform frequency resolution of the human auditory system.

FIG. 14 shows how spectral coefficients of a uniform STFT spectrum may be grouped or split up into partitions or groups so as to mimic the non-uniform frequency resolution of the human auditory system. The frequency axis as is depicted in FIG. 14 extends from 0 Hz to about 8000 Hz, which corresponds to an effective frequency band based on a sampling frequency of 16 kHz.

The different gain filters are computed only for the central frequency of each group. Additionally, this results in a reduction in the computing complexity as compared to the case of a full spectral resolution of a uniform STFT. Before the final partition or group gain filter is applied to the uniform STFT signal spectrum, said STFT signal spectrum is interpolated using Hann interpolation filters.

FIG. 15a shows corresponding Hann interpolation filters which may be employed for smoothing the gain filters over the frequency. FIG. 15b shows the gain filter coefficients as a solid line, which are obtained by interpolating the values of the gain filters in the individual partitions, which for their part are depicted by the fat dots shown in FIG. 15b.

Figure 15:
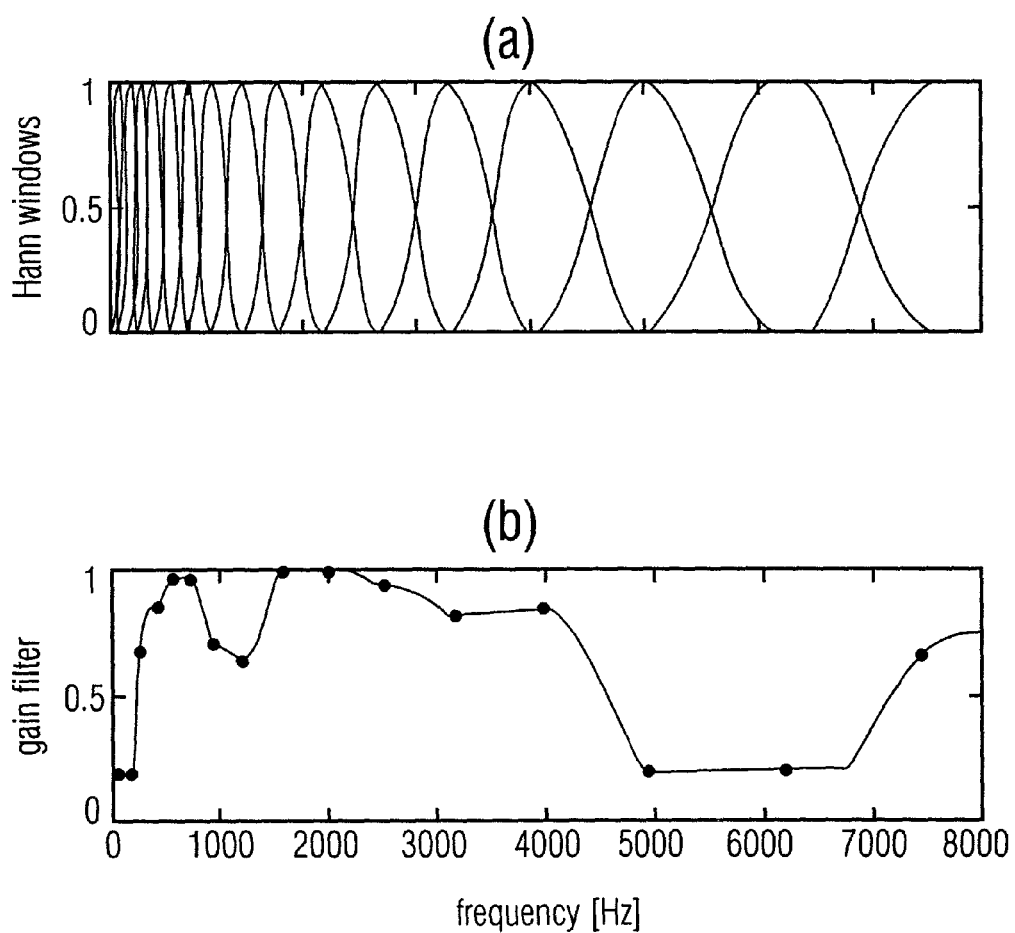
FIG. 15a shows Hann interpolation filters used for smoothing the gain filter over the frequency.
FIG. 15b shows the course of the gain filter coefficients along with an interpolated curve of same.

The partial illustration a of FIG. 15 accurately depicts these Hann filters, whereas partial illustration b depicts an example of gain filter values before and after the interpolation. The dots depicted in FIG. 15b represent the values before the interpolation, whereas the solid line corresponds to said values after the interpolation. The frequency smoothing of the gain filters lead to a smoother variation of the resulting spectrum as a function of the frequency, and thus reduces musical tones and other artifacts.

As the preceding description of preferred embodiments of the present invention showed, preferred embodiments of the present invention in some cases comprise functional units which include the following steps as a brief summary. Some preferred embodiments of the present invention implement receiving at least one loudspeaker signal, receiving at least one microphone signal, converting the loudspeaker signal and the microphone signal to short-time spectra, computing corresponding loudspeaker and microphone power spectra, extracting or separating the loudspeaker power spectrum into stationary and non-stationary power spectra, computing an echo removal gain filter while using the stationary loudspeaker power spectra, computing the echo removal gain filter while using the non-stationary loudspeaker power spectrum, applying the gain filter to the microphone spectrum so as to suppress the echo, and converting the echo-suppressed microphone spectrum to the time domain.

Depending on the circumstances, preferred embodiments of the inventive methods may be implemented in hardware or in software. The implementation may be effected on a digital storage medium, in particular a disk, CD or DVD with electronically readable control signals, which may interact with a programmable computer system such that a preferred embodiment of the inventive method is performed. Generally, preferred embodiments of the present invention thus also consist in a software program product or a computer program product or a program product having a program code, stored on a machine-readable carrier, for performing a preferred embodiment of an inventive method, when the software program product runs on a computer or a processor. In other words, a preferred embodiment of the present invention may thus also be realized as a computer program or a software program or a program having a program code for performing the method, when the program runs on a processor. The processor may be comprised of a computer, a chip card (smart card), an integrated system (SOC=system on chip), an application-specific integrated circuit (ASIC) or any other integrated circuit (IC).

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

References

[1] C. Breining, P. Dreiseitel, E. Hänsler, A. Mader, B. Nitsch, H. Puder, T. Schertler, G. Schmidt, and J. Tilp. Acoustic echo control. IEEE Signal Processing Magazine, 16(4): 42-69, July 1999.

[2] A. N. Birkett and R. A. Goubran. Limitations of handsfree acoustic echo cancellers due to nonlinear loudspeaker distortion and enclosure vibration effects. In Proc. IEEE Workshop on Applications of Signal Processing to Audio and Acoustics, pp. 13-16, New Paltz, October 1995.

[3] G. Schmidt and E. Hänsler. Acoustic echo and noise control: a practical approach. Hoboken: Wiley, 2004.

[4] W. L. B. Jeannes, P. Scalart, G. Faucon, and C. Beaugeant. Combined noise and echo reduction in hands-free systems: a survey. IEEE Transactions on Speech and Audio Processing, 9(8): 808-820, November 2001.

[5] C. Faller and J. Chen. Suppressing acoustic echo in a sampled auditory envelope space. IEEE Trans. on Speech and Audio Proc., 13(5): 1.048-1.062, September 2005.

[6] C. Faller and C. Tournery. Estimating the delay and coloration effect of the acoustic echo path for low complexity echo suppression. In Proc. Intl. Works. on Acoust. Echo and Noise Control (IWAENC), September 2005.

[7] W. Etter and G. S. Moschytz. Noise reduction by noise-adaptive spectral magnitude expansion. J. Audio Eng. Soc., 42: 341-349, May 1994.

[8] O. Capp'e. Elimination of the musical noise phenomenon with the ephrain and malah noise suppressor. IEEE Trans. Speech and Audio Processing, 2(2): 345-349, April 1994.

[9] C. Faller and F. Baumgarte. Binaural Cue Coding—Part II: Schemes and applications. IEEE Trans. on Speech and Audio Proc., 11(6): 520-531, November 2003.

[10] B. R. Glasberg and B. C. J. Moore. Derivation of auditory filter shapes from notched-noise data. Hear. Res., 47: 103-138, 1990.

The invention claimed is:

1. An apparatus configured to compute filter coefficients for an adaptive filter configured to filter a microphone signal to suppress an echo from a loudspeaker signal, the apparatus comprising:
an echo estimator configured to estimate an echo contribution spectrum or an echo power spectrum of the microphone signal;
an extractor configured to extract a stationary component signal and a non-stationary component signal from the loudspeaker signal or from a signal derived, based on the estimated echo contribution spectrum or the estimated echo power spectrum of the microphone signal, from the loudspeaker signal; and
a computer configured to compute the filter coefficients of the adaptive filter; wherein
the computer computes the filter coefficients according to the stationary component signal and the non-stationary component signal extracted from the loudspeaker signal and according to the estimated echo contribution spectrum or the echo power spectrum of the microphone signal; or
the computer computes the filter coefficients according to the stationary component signal and the non-stationary component signal extracted from the signal derived from the loudspeaker signal.

2. The apparatus as claimed in claim 1, wherein the extractor is configured to extract the stationary component signal on the basis of an averaging of an energy-related value of a bandpass signal of the loudspeaker signal or of the signal derived.

3. The apparatus as claimed in claim 2, wherein the extractor is configured to perform the averaging in the form of a floating averaging over a value of a current data block on which the bandpass signal is based, and only over values of at least one data block which temporally precedes the current data block.

4. The apparatus as claimed in claim 3, wherein the extractor is configured to perform a recursive computation of the floating averaging on the basis of an addition of the energy-related value of the current data block to a value of a previously computed averaging in dependence on an addition parameter, the addition parameter being smaller, in the event that the energy-related value of the current data-block is larger than that of the previously determined value of the averaging, than in the event that the energy-related value of the current data block is smaller than the previously determined value of the averaging.

5. The apparatus as claimed in claim 2, wherein the extractor is configured to perform the averaging as a floating averaging on the basis of different computing specifications in dependence on a comparison of the energy-related value of the current data block and an energy-related value of a preceding data block or of a value of an averaging previously acquired.

6. The apparatus as claimed in claim 1, wherein the extractor is configured to extract the non-stationary component signal on the basis of a bandpass signal of the loudspeaker signal or of the signal derived.

7. The apparatus as claimed in claim 1, wherein the extractor is configured to extract the non-stationary component signal on the basis of the stationary component signal and a gain filter.

8. The apparatus as claimed in claim 7, wherein the extractor is configured such that the gain filter depends on a variable or a non-variable control parameter.

9. The apparatus as claimed in claim 8, wherein the extractor is configured to determine the control parameter of the gain filter on the basis of a coherence function based on the loudspeaker signal or on a signal derived from the loudspeaker signal, and based on the microphone signal or on a signal derived from the microphone signal.

10. The apparatus as claimed in claim 9, wherein the extractor is configured to determine the control parameter on the basis of an averaged value of the coherence function over a plurality of bandpass signals of the loudspeaker signal or of the signal derived from the loudspeaker signal, and of the microphone signal or of the signal derived from the microphone signal.

11. The apparatus as claimed in claim 1, wherein the apparatus further comprises a bundler configured to bundle a plurality of microphone signals so as to acquire a bundled microphone signal as the microphone signal or as a derived microphone signal.

12. The apparatus as claimed in claim 1, wherein the extractor is configured to output the stationary component signal and the non-stationary component signal, and wherein the computer is configured to compute first filter coefficients on the basis of the stationary component signal, and to compute second filter coefficients on the basis of the non-stationary component signal, and wherein the computer is further configured to determine the filter coefficients on the basis of the first and second filter coefficients.

13. The apparatus as claimed in claim 12, wherein the extractor is configured to compute the filter coefficients such that the filter coefficients correspond to a series connection of a first filter to which the first filter coefficients correspond, and to a second filter, to which the second filter coefficients correspond.

14. The apparatus as claimed in claim 1, wherein the extractor is configured to output the stationary component signal and the non-stationary component signal, and wherein the computer is configured to compute first filter coefficients on the basis of the stationary component signal, and to compute second filter coefficients on the basis of the non-stationary component signal, and wherein the computer is further configured to determine the filter coefficients either on the basis of the first filter coefficients or on the basis of the second filter coefficients.

15. The apparatus as claimed in claim 14, wherein the computer is configured to determine the filter coefficients on the basis of those filter coefficients of the first filter coefficients or of the second filter coefficients which correspond to a higher level of attenuation.

16. The apparatus as claimed in claim 1, wherein the extractor is configured to provide the stationary component signal or the non-stationary component signal as well as a control information signal which comprises information on the component signal output, the computer being configured to compute the filter coefficients on the basis of the signal output by the extractor, of a signal derived from same, as well as of information comprised in the control information signal.

17. The apparatus as claimed in claim 16, wherein the extractor is configured to output the stationary component signal or the non-stationary component signal to the computer in dependence on a relationship of an energy-related value of the stationary component signal to an energy-related value of the non-stationary component signal.

18. The apparatus as claimed in claim 1, wherein the extractor is configured to extract the stationary component signal or the non-stationary component signal as estimated signals.

19. The apparatus as claimed in claim 1, wherein the extractor is configured to output the stationary component signal and the non-stationary component signal.

20. The apparatus as claimed in claim 1, further comprising the adaptive filter so as to filter the microphone signal on the basis of the filter coefficients.

21. The apparatus as claimed in claim 1, further comprising a bundler and a plurality of adaptive filters arranged to filter at least two of the microphone signals of the plurality of microphone signals on the basis of the same filter coefficients of the computer.

22. The apparatus as claimed in claim 1, further comprising a bundler configured to bundle a plurality of loudspeaker signals so as to acquire a bundled loudspeaker signal as the loudspeaker signal or as the signal derived from the loudspeaker signal.

23. A method of computing filter coefficients for an adaptive filter configured to filter a microphone signal to suppress an echo from a loudspeaker signal, the method comprising:
  estimating an echo contribution spectrum or an echo power spectrum of the microphone signal;
  extracting a stationary component signal and a non-stationary component signal from the loudspeaker signal or from a signal derived, based on the estimated echo contribution spectrum or the estimated echo power spectrum of the microphone signal, from the loudspeaker signal; and
  computing the filter coefficients for the adaptive filter; wherein
    the filter coefficients are computed according to the stationary component signal and the non-stationary component signal extracted from the loudspeaker signal and according to the estimated echo contribution spectrum or the echo power spectrum of the microphone signal; or
    the filter coefficients are computed according to the stationary component signal and the non-stationary component signal extracted from the signal derived from the loudspeaker signal.

24. A tangible computer readable medium including a program comprising a program code for performing, when the program runs on a processor, the method according to claim 23.

* * * * *

UNITED STATES PATENT AND TRADEMARK OFFICE
CERTIFICATE OF CORRECTION

PATENT NO. : 8,462,958 B2  Page 1 of 1
APPLICATION NO. : 12/864890
DATED : June 11, 2013
INVENTOR(S) : Kuech et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 360 days.

Signed and Sealed this
Eighth Day of September, 2015

Michelle K. Lee
*Director of the United States Patent and Trademark Office*